(12) United States Patent
Taniguchi et al.

(10) Patent No.: US 8,915,448 B2
(45) Date of Patent: Dec. 23, 2014

(54) ANTENNA DEVICE AND RADIO FREQUENCY IC DEVICE

(75) Inventors: Katsumi Taniguchi, Kyoto (JP); Jun Sasaki, Kyoto (JP); Noboru Kato, Moriyama (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 13/232,102

(22) Filed: Sep. 14, 2011

(65) Prior Publication Data

US 2012/0235871 A1     Sep. 20, 2012

Related U.S. Application Data

(63) Continuation of application No. 12/326,117, filed on Dec. 2, 2008, now Pat. No. 8,070,070.

(60) Provisional application No. 61/016,912, filed on Dec. 27, 2007.

(30) Foreign Application Priority Data

Dec. 26, 2007   (JP) ................................. 2007-334413

(51) Int. Cl.
  *G06K 19/06*  (2006.01)
  *G06K 19/07*  (2006.01)
  *H01Q 1/22*   (2006.01)
  *H01Q 1/52*   (2006.01)
  *H01Q 7/00*   (2006.01)

(52) U.S. Cl.
  CPC ........ *G06K 19/0723* (2013.01); *G06K 19/0726* (2013.01); *H01Q 1/2208* (2013.01); *H01Q 1/52* (2013.01); *H01Q 7/00* (2013.01)

USPC .......................................... 235/492; 235/487

(58) Field of Classification Search
  USPC ................................. 235/487, 492
  See application file for complete search history.

(56) References Cited

U.S. PATENT DOCUMENTS 3,364,564 A      1/1968  Kurtz et al.
3,740,742 A *    6/1973  Thompson et al. ........ 340/572.3
(Continued)

FOREIGN PATENT DOCUMENTS

CA      2 279 176 A1    7/1998
CN      1447954 A       10/2003
(Continued)

OTHER PUBLICATIONS

Official communication issued in counterpart International Application No. PCT/JP2008/071502, mailed Feb. 24, 2009.

(Continued)

*Primary Examiner* — Paultep Savusdiphol
(74) *Attorney, Agent, or Firm* — Keating & Bennett, LLP

(57) ABSTRACT

An antenna device is arranged to transmit or receive a radio frequency communication signal to or from an external device such as a reader/writer, and is arranged such that an antenna resonance circuit including an antenna coil and a capacitor is connected to an additional resonance circuit including an inductor and a capacitor. A radio frequency IC device preferably includes the antenna device and a radio frequency IC. The antenna device is constructed such that a change in characteristics thereof caused by a change in the distance between a radio frequency IC device and a reader/writer is minimized, and the radio frequency IC device performs communication with high reliability.

7 Claims, 14 Drawing Sheets

(56) References Cited

U.S. PATENT DOCUMENTS

| | | | |
|---|---|---|---|
| 4,654,641 A * | 3/1987 | Ferguson et al. | 340/572.2 |
| 4,794,397 A | 12/1988 | Ohe et al. | |
| 5,119,070 A * | 6/1992 | Matsumoto et al. | 340/572.5 |
| 5,232,765 A | 8/1993 | Yano et al. | |
| 5,253,969 A | 10/1993 | Richert | |
| 5,337,063 A | 8/1994 | Takahira | |
| 5,374,937 A | 12/1994 | Tsunekawa et al. | |
| 5,399,060 A | 3/1995 | Richert | |
| 5,491,483 A | 2/1996 | D'Hont | |
| 5,528,222 A | 6/1996 | Moskowitz et al. | |
| 5,757,074 A | 5/1998 | Matloubian et al. | |
| 5,854,480 A | 12/1998 | Noto | |
| 5,903,239 A | 5/1999 | Takahashi et al. | |
| 5,936,150 A | 8/1999 | Kobrin et al. | |
| 5,955,723 A | 9/1999 | Reiner | |
| 5,995,006 A | 11/1999 | Walsh | |
| 6,104,611 A | 8/2000 | Glover et al. | |
| 6,107,920 A | 8/2000 | Eberhardt et al. | |
| 6,172,608 B1 | 1/2001 | Cole | |
| 6,181,287 B1 | 1/2001 | Beigel | |
| 6,190,942 B1 | 2/2001 | Wilm et al. | |
| 6,249,258 B1 | 6/2001 | Bloch et al. | |
| 6,259,369 B1 | 7/2001 | Monico | |
| 6,271,803 B1 | 8/2001 | Watanabe et al. | |
| 6,335,663 B1 * | 1/2002 | Satoh et al. | 333/126 |
| 6,335,686 B1 | 1/2002 | Goff et al. | |
| 6,362,784 B1 | 3/2002 | Kane et al. | |
| 6,367,143 B1 | 4/2002 | Sugimura | |
| 6,378,774 B1 | 4/2002 | Emori et al. | |
| 6,406,990 B1 | 6/2002 | Kawai | |
| 6,429,818 B1 * | 8/2002 | Johnson et al. | 343/702 |
| 6,448,874 B1 | 9/2002 | Shiino et al. | |
| 6,456,249 B1 * | 9/2002 | Johnson et al. | 343/702 |
| 6,462,716 B1 | 10/2002 | Kushihi | |
| 6,542,050 B1 | 4/2003 | Arai et al. | |
| 6,600,459 B2 | 7/2003 | Yokoshima et al. | |
| 6,634,564 B2 | 10/2003 | Kuramochi | |
| 6,664,645 B2 | 12/2003 | Kawai | |
| 6,763,254 B2 | 7/2004 | Nishikawa | |
| 6,812,707 B2 | 11/2004 | Yonezawa et al. | |
| 6,828,881 B2 | 12/2004 | Mizutani et al. | |
| 6,837,438 B1 | 1/2005 | Takasugi et al. | |
| 6,861,731 B2 | 3/2005 | Buijsman et al. | |
| 6,927,738 B2 | 8/2005 | Senba et al. | |
| 6,963,729 B2 | 11/2005 | Uozumi | |
| 7,088,249 B2 | 8/2006 | Senba et al. | |
| 7,088,307 B2 | 8/2006 | Imaizumi | |
| 7,112,952 B2 | 9/2006 | Arai et al. | |
| 7,119,693 B1 * | 10/2006 | Devilbiss | 340/572.5 |
| 7,129,834 B2 | 10/2006 | Naruse et al. | |
| 7,164,344 B2 * | 1/2007 | Deguchi et al. | 340/10.51 |
| 7,248,221 B2 | 7/2007 | Kai et al. | |
| 7,250,910 B2 | 7/2007 | Yoshikawa et al. | |
| 7,276,929 B2 | 10/2007 | Arai et al. | |
| 7,317,396 B2 | 1/2008 | Ujino | |
| 7,405,664 B2 | 7/2008 | Sakama et al. | |
| 7,458,518 B2 * | 12/2008 | Fukuda et al. | 235/492 |
| 7,498,802 B2 * | 3/2009 | Takahata | 324/207.15 |
| 7,843,345 B2 * | 11/2010 | Lazar | 340/572.5 |
| 2002/0011967 A1 | 1/2002 | Goff et al. | |
| 2002/0015002 A1 | 2/2002 | Yasukawa et al. | |
| 2002/0044092 A1 | 4/2002 | Kushihi | |
| 2002/0067316 A1 | 6/2002 | Yokoshima et al. | |
| 2002/0070902 A1 * | 6/2002 | Johnson et al. | 343/702 |
| 2002/0093457 A1 | 7/2002 | Hamada et al. | |
| 2003/0006901 A1 | 1/2003 | Kim et al. | |
| 2003/0020661 A1 | 1/2003 | Sato | |
| 2003/0045324 A1 | 3/2003 | Nagumo et al. | |
| 2003/0169153 A1 | 9/2003 | Muller | |
| 2003/0178483 A1 | 9/2003 | Wakabayashi | |
| 2004/0001027 A1 | 1/2004 | Killen et al. | |
| 2004/0026519 A1 | 2/2004 | Usami et al. | |
| 2004/0056823 A1 | 3/2004 | Zuk et al. | |
| 2004/0066617 A1 | 4/2004 | Hirabayashi et al. | |
| 2004/0134985 A1 * | 7/2004 | Deguchi et al. | 235/451 |
| 2004/0217915 A1 | 11/2004 | Imaizumi | |
| 2004/0219956 A1 | 11/2004 | Iwai et al. | |
| 2004/0227673 A1 | 11/2004 | Iwai et al. | |
| 2004/0252064 A1 | 12/2004 | Yuanzhu | |
| 2005/0092836 A1 | 5/2005 | Kudo | |
| 2005/0099337 A1 | 5/2005 | Takei et al. | |
| 2005/0125093 A1 | 6/2005 | Kikuchi et al. | |
| 2005/0134460 A1 | 6/2005 | Usami | |
| 2005/0134506 A1 | 6/2005 | Egbert | |
| 2005/0138798 A1 | 6/2005 | Sakama et al. | |
| 2005/0140512 A1 | 6/2005 | Sakama et al. | |
| 2005/0232412 A1 | 10/2005 | Ichihara et al. | |
| 2005/0236623 A1 | 10/2005 | Takechi et al. | |
| 2005/0275539 A1 | 12/2005 | Sakama et al. | |
| 2006/0001138 A1 | 1/2006 | Sakama et al. | |
| 2006/0032926 A1 | 2/2006 | Baba et al. | |
| 2006/0044192 A1 | 3/2006 | Egbert | |
| 2006/0055601 A1 | 3/2006 | Kameda et al. | |
| 2006/0071084 A1 | 4/2006 | Detig et al. | |
| 2006/0109185 A1 | 5/2006 | Iwai et al. | |
| 2006/0145872 A1 | 7/2006 | Tanaka et al. | |
| 2006/0158316 A1 | 7/2006 | Eckstein | |
| 2006/0158380 A1 | 7/2006 | Son et al. | |
| 2006/0170606 A1 | 8/2006 | Yamagajo et al. | |
| 2006/0214801 A1 | 9/2006 | Murofushi et al. | |
| 2006/0220871 A1 | 10/2006 | Baba et al. | |
| 2006/0244676 A1 | 11/2006 | Uesaka | |
| 2006/0267138 A1 | 11/2006 | Kobayashi | |
| 2007/0004028 A1 | 1/2007 | Lair et al. | |
| 2007/0018893 A1 | 1/2007 | Kai et al. | |
| 2007/0040028 A1 | 2/2007 | Kawamata | |
| 2007/0052613 A1 | 3/2007 | Gallschuetz et al. | |
| 2007/0057854 A1 | 3/2007 | Oodachi et al. | |
| 2007/0069037 A1 | 3/2007 | Kawai | |
| 2007/0132591 A1 | 6/2007 | Khatri | |
| 2007/0158438 A1 * | 7/2007 | Fukuda et al. | 235/492 |
| 2007/0164414 A1 | 7/2007 | Dokai et al. | |
| 2007/0200782 A1 | 8/2007 | Hayama et al. | |
| 2007/0229276 A1 | 10/2007 | Yamagajo et al. | |
| 2007/0252700 A1 | 11/2007 | Ishihara et al. | |
| 2007/0252703 A1 | 11/2007 | Kato et al. | |
| 2007/0279286 A1 * | 12/2007 | Coutts et al. | 343/700 MS |
| 2007/0285335 A1 | 12/2007 | Bungo et al. | |
| 2007/0290928 A1 | 12/2007 | Chang et al. | |
| 2008/0007253 A1 * | 1/2008 | Takahata | 324/207.22 |
| 2008/0018424 A1 * | 1/2008 | Takahata | 336/20 |
| 2008/0024156 A1 | 1/2008 | Arai et al. | |
| 2008/0087990 A1 | 4/2008 | Kato et al. | |
| 2008/0122631 A1 * | 5/2008 | Kodukula et al. | 340/572.8 |
| 2008/0169905 A1 | 7/2008 | Slatter | |
| 2008/0272885 A1 | 11/2008 | Atherton | |
| 2009/0002130 A1 | 1/2009 | Kato | |
| 2009/0009007 A1 | 1/2009 | Kato et al. | |
| 2009/0021446 A1 | 1/2009 | Kataya et al. | |
| 2009/0065594 A1 | 3/2009 | Kato et al. | |
| 2009/0109102 A1 | 4/2009 | Dokai et al. | |
| 2009/0160719 A1 | 6/2009 | Kato et al. | |
| 2009/0201116 A1 | 8/2009 | Orihara | |
| 2009/0224061 A1 | 9/2009 | Kato et al. | |
| 2009/0231106 A1 | 9/2009 | Okamura | |
| 2009/0262041 A1 | 10/2009 | Ikemoto et al. | |
| 2009/0278687 A1 | 11/2009 | Kato | |
| 2009/0321527 A1 | 12/2009 | Kato et al. | |
| 2011/0063184 A1 | 3/2011 | Furumura et al. | |

FOREIGN PATENT DOCUMENTS

| | | |
|---|---|---|
| DE | 10 2006 057 369 A1 | 6/2008 |
| EP | 0 694 874 A2 | 1/1996 |
| EP | 0 977 145 A2 | 2/2000 |
| EP | 1 010 543 A1 | 6/2000 |
| EP | 1 160 915 A2 | 12/2001 |
| EP | 1 170 795 A2 | 1/2002 |
| EP | 1 227 540 A1 | 7/2002 |
| EP | 1 280 232 A1 | 1/2003 |
| EP | 1 280 350 A1 | 1/2003 |
| EP | 1 343 223 A1 | 9/2003 |
| EP | 1 357 511 A2 | 10/2003 |
| EP | 1 548 872 A1 | 6/2005 |

(56) References Cited

FOREIGN PATENT DOCUMENTS

| | | |
|---|---|---|
| EP | 1 703 589 A1 | 9/2006 |
| EP | 1 744 398 A1 | 1/2007 |
| EP | 1 841 005 A1 | 10/2007 |
| EP | 1 865 574 A1 | 12/2007 |
| EP | 1 976 056 A1 | 10/2008 |
| EP | 1 993 170 A1 | 11/2008 |
| EP | 2 009 738 A1 | 12/2008 |
| EP | 2 012 258 A1 | 1/2009 |
| EP | 2 148 449 A1 | 1/2010 |
| EP | 2 251 934 A1 | 11/2010 |
| GB | 2 305 075 A | 3/1997 |
| JP | 50-143451 A | 11/1975 |
| JP | 62-127140 U | 8/1987 |
| JP | 02-164105 A | 6/1990 |
| JP | 03-262313 A | 11/1991 |
| JP | 04-150011 A | 5/1992 |
| JP | 04-167500 A | 6/1992 |
| JP | 05-327331 A | 12/1993 |
| JP | 6-53733 A | 2/1994 |
| JP | 06-077729 A | 3/1994 |
| JP | 06-177635 A | 6/1994 |
| JP | 6-260949 A | 9/1994 |
| JP | 07-183836 A | 7/1995 |
| JP | 08-056113 A | 2/1996 |
| JP | 8-87580 A | 4/1996 |
| JP | 08-088586 A | 4/1996 |
| JP | 08-88586 A | 4/1996 |
| JP | 11-149537 A | 6/1996 |
| JP | 08-176421 A | 7/1996 |
| JP | 08-180160 A | 7/1996 |
| JP | 08-279027 A | 10/1996 |
| JP | 08-307126 A | 11/1996 |
| JP | 08-330372 A | 12/1996 |
| JP | 09-014150 A | 1/1997 |
| JP | 09-035025 A | 2/1997 |
| JP | 9-93029 A | 4/1997 |
| JP | 09-245381 A | 9/1997 |
| JP | 09-252217 A | 9/1997 |
| JP | 09-270623 A | 10/1997 |
| JP | 9-512367 A | 12/1997 |
| JP | 10-069533 A | 3/1998 |
| JP | 10-69533 A | 3/1998 |
| JP | 10-505466 A | 5/1998 |
| JP | 10-171954 A | 6/1998 |
| JP | 10-193849 A | 7/1998 |
| JP | 10-193851 A | 7/1998 |
| JP | 10-293828 A | 11/1998 |
| JP | 11-039441 A | 2/1999 |
| JP | 11-075329 A | 3/1999 |
| JP | 11-085937 A | 3/1999 |
| JP | 11-88241 A | 3/1999 |
| JP | 11-102424 A | 4/1999 |
| JP | 11-103209 A | 4/1999 |
| JP | 11-149536 A | 6/1999 |
| JP | 11-149538 A | 6/1999 |
| JP | 11-219420 A | 8/1999 |
| JP | 11-220319 A | 8/1999 |
| JP | 11-328352 A | 11/1999 |
| JP | 11-346114 A | 12/1999 |
| JP | 11-515094 A | 12/1999 |
| JP | 2000-21128 A | 1/2000 |
| JP | 2000-021639 A | 1/2000 |
| JP | 2000-022421 A | 1/2000 |
| JP | 2005-229474 A | 1/2000 |
| JP | 2000-059260 A | 2/2000 |
| JP | 2000-085283 A | 3/2000 |
| JP | 2000-090207 A | 3/2000 |
| JP | 2000-132643 A | 5/2000 |
| JP | 2000-137778 A | 5/2000 |
| JP | 2000-137779 A | 5/2000 |
| JP | 2000-137785 A | 5/2000 |
| JP | 2000-148948 A | 5/2000 |
| JP | 2000-172812 A | 6/2000 |
| JP | 2000-209013 A | 7/2000 |
| JP | 2000-222540 A | 8/2000 |
| JP | 2000-510271 A | 8/2000 |
| JP | 2000-242754 A | 9/2000 |
| JP | 2000-243797 A | 9/2000 |
| JP | 2000-251049 A | 9/2000 |
| JP | 2000-261230 A | 9/2000 |
| JP | 2000-276569 A | 10/2000 |
| JP | 2000-286634 A | 10/2000 |
| JP | 2000-286760 A | 10/2000 |
| JP | 2000-311226 A | 11/2000 |
| JP | 2000-321984 A | 11/2000 |
| JP | 3075400 U | 11/2000 |
| JP | 2000-349680 A | 12/2000 |
| JP | 2001-10264 A | 1/2001 |
| JP | 2001-028036 A | 1/2001 |
| JP | 2007-18067 A | 1/2001 |
| JP | 2001-043340 A | 2/2001 |
| JP | 2001-66990 A | 3/2001 |
| JP | 2001-76111 A | 3/2001 |
| JP | 2001-101369 A | 4/2001 |
| JP | 2001-505682 A | 4/2001 |
| JP | 2001-168628 A | 6/2001 |
| JP | 2001-188890 A | 7/2001 |
| JP | 2001-240046 A | 9/2001 |
| JP | 2001-256457 A | 9/2001 |
| JP | 2001-257292 A | 9/2001 |
| JP | 2001-514777 A | 9/2001 |
| JP | 2001-319380 A | 11/2001 |
| JP | 2001-331976 A | 11/2001 |
| JP | 2001-332923 A | 11/2001 |
| JP | 2001-339226 A | 12/2001 |
| JP | 2001-344574 A | 12/2001 |
| JP | 2001-351084 A | 12/2001 |
| JP | 2001-352176 A | 12/2001 |
| JP | 2002-024776 A | 1/2002 |
| JP | 2002-026513 A | 1/2002 |
| JP | 2002-32731 A | 1/2002 |
| JP | 2002-042076 A | 2/2002 |
| JP | 2002-063557 A | 2/2002 |
| JP | 2002-505645 A | 2/2002 |
| JP | 2002-076750 A | 3/2002 |
| JP | 2002-76750 A | 3/2002 |
| JP | 2002-150245 A | 5/2002 |
| JP | 2002-157564 A | 5/2002 |
| JP | 2002-158529 A | 5/2002 |
| JP | 2002-175508 A | 6/2002 |
| JP | 2002-183690 A | 6/2002 |
| JP | 2002-185358 A | 6/2002 |
| JP | 2002-204117 A | 7/2002 |
| JP | 2002-522849 A | 7/2002 |
| JP | 2002-230128 A | 8/2002 |
| JP | 2002-232221 A | 8/2002 |
| JP | 2002-252117 A | 9/2002 |
| JP | 2002-259934 A | 9/2002 |
| JP | 2002-280821 A | 9/2002 |
| JP | 2002-298109 A | 10/2002 |
| JP | 2002-308437 A | 10/2002 |
| JP | 2002-319008 A | 10/2002 |
| JP | 2002-319009 A | 10/2002 |
| JP | 2002-319812 A | 10/2002 |
| JP | 2002-362613 A | 12/2002 |
| JP | 2002-366917 A | 12/2002 |
| JP | 2002-373029 A | 12/2002 |
| JP | 2002-373323 U | 12/2002 |
| JP | 2002-374139 A | 12/2002 |
| JP | 2003-006599 A | 1/2003 |
| JP | 2003-016412 A | 1/2003 |
| JP | 2003-022912 A | 1/2003 |
| JP | 2003-026177 A | 1/2003 |
| JP | 2003-030612 A | 1/2003 |
| JP | 2003-44789 A | 2/2003 |
| JP | 2003-046318 A | 2/2003 |
| JP | 2003-58840 A | 2/2003 |
| JP | 2003-067711 A | 3/2003 |
| JP | 2003-069335 A | 3/2003 |
| JP | 2003-076947 A | 3/2003 |
| JP | 2003-76963 A | 3/2003 |
| JP | 2003-78333 A | 3/2003 |
| JP | 2003-078336 A | 3/2003 |
| JP | 2003-085501 A | 3/2003 |

(56) References Cited

FOREIGN PATENT DOCUMENTS

| | | |
|---|---|---|
| JP | 2003-085520 A | 3/2003 |
| JP | 2003-87008 A | 3/2003 |
| JP | 2003-87044 A | 3/2003 |
| JP | 2003-099720 A | 4/2003 |
| JP | 2003-099721 A | 4/2003 |
| JP | 2003-110344 A | 4/2003 |
| JP | 2003-132330 A | 5/2003 |
| JP | 2003-134007 A | 5/2003 |
| JP | 2003-155062 A | 5/2003 |
| JP | 2003-158414 A | 5/2003 |
| JP | 2003-168760 A | 6/2003 |
| JP | 2003-179565 A | 6/2003 |
| JP | 2003-187207 A | 7/2003 |
| JP | 2003-187211 A | 7/2003 |
| JP | 2003-188338 A | 7/2003 |
| JP | 2003-188620 A | 7/2003 |
| JP | 2003-198230 A | 7/2003 |
| JP | 2003-209421 A | 7/2003 |
| JP | 2003-216919 A | 7/2003 |
| JP | 2003-218624 A | 7/2003 |
| JP | 2003-233780 A | 8/2003 |
| JP | 2003-242471 A | 8/2003 |
| JP | 2003-243918 A | 8/2003 |
| JP | 2003-249813 A | 9/2003 |
| JP | 2003-529163 A | 9/2003 |
| JP | 2003-288560 A | 10/2003 |
| JP | 2003-309418 A | 10/2003 |
| JP | 2003-317060 A | 11/2003 |
| JP | 2003-331246 A | 11/2003 |
| JP | 2003-332820 A | 11/2003 |
| JP | 2003-536302 A | 12/2003 |
| JP | 2004-040597 A | 2/2004 |
| JP | 2004-505481 A | 2/2004 |
| JP | 2004-082775 A | 3/2004 |
| JP | 2004-88218 A | 3/2004 |
| JP | 2004-93693 A | 3/2004 |
| JP | 2004-096566 A | 3/2004 |
| JP | 2004-127230 A | 4/2004 |
| JP | 2004-140513 A | 5/2004 |
| JP | 2004-213582 A | 7/2004 |
| JP | 2004-519916 A | 7/2004 |
| JP | 2004-234595 A | 8/2004 |
| JP | 2004-253858 A | 9/2004 |
| JP | 2004-527864 A | 9/2004 |
| JP | 2004-280390 A | 10/2004 |
| JP | 2004-282403 A | 10/2004 |
| JP | 2004-287767 A | 10/2004 |
| JP | 2004-297249 A | 10/2004 |
| JP | 2004-297681 A | 10/2004 |
| JP | 2004-304370 A | 10/2004 |
| JP | 2004-319848 A | 11/2004 |
| JP | 2004-326380 A | 11/2004 |
| JP | 2004-334268 A | 11/2004 |
| JP | 2004-336250 A | 11/2004 |
| JP | 2004-343000 A | 12/2004 |
| JP | 2004-362190 A | 12/2004 |
| JP | 2004-362341 A | 12/2004 |
| JP | 2004-362602 A | 12/2004 |
| JP | 2005-5866 A | 1/2005 |
| JP | 2005-18156 A | 1/2005 |
| JP | 2005-124061 A | 5/2005 |
| JP | 2005-128592 A | 5/2005 |
| JP | 2005-129019 A | 5/2005 |
| JP | 2005-135132 A | 5/2005 |
| JP | 2005-136528 A | 5/2005 |
| JP | 2005-137032 A | 5/2005 |
| JP | 3653099 B2 | 5/2005 |
| JP | 2005-165839 A | 6/2005 |
| JP | 2005-167327 A | 6/2005 |
| JP | 2005-167813 A | 6/2005 |
| JP | 2005-190417 A | 7/2005 |
| JP | 2005-191705 A | 7/2005 |
| JP | 2005-210676 A | 8/2005 |
| JP | 2005-210680 A | 8/2005 |
| JP | 2005-217822 A | 8/2005 |
| JP | 2005-236339 A | 9/2005 |
| JP | 2005-244778 A | 9/2005 |
| JP | 2005-252853 A | 9/2005 |
| JP | 2005-275870 A | 10/2005 |
| JP | 2005-284352 A | 10/2005 |
| JP | 2005-293537 A | 10/2005 |
| JP | 2005-295135 A | 10/2005 |
| JP | 2005-311205 A | 11/2005 |
| JP | 2005-321305 A | 11/2005 |
| JP | 2005-322119 A | 11/2005 |
| JP | 2005-335755 A | 12/2005 |
| JP | 2005-340759 A | 12/2005 |
| JP | 2005-345802 A | 12/2005 |
| JP | 2005-346820 A | 12/2005 |
| JP | 2005-352858 A | 12/2005 |
| JP | 2006-013976 A | 1/2006 |
| JP | 2006-13976 A | 1/2006 |
| JP | 2006-025390 A | 1/2006 |
| JP | 2006-031766 A | 2/2006 |
| JP | 2006-39902 A | 2/2006 |
| JP | 2006-42059 A | 2/2006 |
| JP | 2006-42097 A | 2/2006 |
| JP | 2006-053833 A | 2/2006 |
| JP | 2006-67479 A | 3/2006 |
| JP | 2006-72706 A | 3/2006 |
| JP | 2006-80367 A | 3/2006 |
| JP | 2006-92630 A | 4/2006 |
| JP | 2006-102953 A | 4/2006 |
| JP | 2006-107296 A | 4/2006 |
| JP | 2006-513594 A | 4/2006 |
| JP | 2006-148462 A | 6/2006 |
| JP | 2006-148518 A | 6/2006 |
| JP | 2006-151402 A | 6/2006 |
| JP | 2006-174151 A | 6/2006 |
| JP | 2006-195795 A | 7/2006 |
| JP | 2006-203187 A | 8/2006 |
| JP | 2006-203852 A | 8/2006 |
| JP | 2006-217000 A | 8/2006 |
| JP | 2006-232292 A | 9/2006 |
| JP | 2006-237674 A | 9/2006 |
| JP | 2006-270212 A | 10/2006 |
| JP | 2006-270766 A | 10/2006 |
| JP | 2006-285911 A | 10/2006 |
| JP | 2006-295879 A | 10/2006 |
| JP | 2006-302219 A | 11/2006 |
| JP | 2006-309401 A | 11/2006 |
| JP | 2006-311239 A | 11/2006 |
| JP | 2006-323481 A | 11/2006 |
| JP | 2006-339964 A | 12/2006 |
| JP | 2007-007888 A | 1/2007 |
| JP | 2007-13120 A | 1/2007 |
| JP | 2007-28002 A | 2/2007 |
| JP | 2007-043535 A | 2/2007 |
| JP | 2007-048126 A | 2/2007 |
| JP | 2007-65822 A | 3/2007 |
| JP | 2007-79687 A | 3/2007 |
| JP | 2007-81712 A | 3/2007 |
| JP | 2007-096768 A | 4/2007 |
| JP | 2007-102348 A | 4/2007 |
| JP | 2007-122542 A | 5/2007 |
| JP | 2007-150642 A | 6/2007 |
| JP | 2007-150868 A | 6/2007 |
| JP | 2007-159083 A | 6/2007 |
| JP | 2007-159129 A | 6/2007 |
| JP | 2007-166133 A | 6/2007 |
| JP | 2007-172369 A | 7/2007 |
| JP | 2007-172527 A | 7/2007 |
| JP | 2007-228325 A | 9/2007 |
| JP | 2007-266999 A | 10/2007 |
| JP | 2007-272264 A | 10/2007 |
| JP | 2007-287128 A | 11/2007 |
| JP | 2007-312350 A | 11/2007 |
| JP | 2007-324865 A | 12/2007 |
| JP | 2008-033716 A | 2/2008 |
| JP | 2008-72243 A | 3/2008 |
| JP | 2008-097426 A | 4/2008 |
| JP | 4069958 B2 | 4/2008 |
| JP | 2008-107947 A | 5/2008 |
| JP | 2008-148345 A | 6/2008 |

(56) References Cited

FOREIGN PATENT DOCUMENTS

| | | |
|---|---|---|
| JP | 2008-519347 A | 6/2008 |
| JP | 2008-160874 A | 7/2008 |
| JP | 11-175678 A | 1/2009 |
| JP | 2009-25870 A | 2/2009 |
| JP | 2009-27291 A | 2/2009 |
| JP | 2009-044715 A | 2/2009 |
| JP | 2010-009196 A | 1/2010 |
| NL | 9100176 A | 3/1992 |
| NL | 9100347 A | 3/1992 |
| WO | 98/33142 A1 | 7/1998 |
| WO | 99/67754 A1 | 12/1999 |
| WO | 00/10122 A2 | 2/2000 |
| WO | 01/95242 A2 | 12/2001 |
| WO | 02/48980 A1 | 6/2002 |
| WO | 02/061675 A1 | 8/2002 |
| WO | 02/097723 A1 | 12/2002 |
| WO | 03/079305 A1 | 9/2003 |
| WO | 2004/036772 A1 | 4/2004 |
| WO | 2004/070879 A | 8/2004 |
| WO | 2004/072892 A1 | 8/2004 |
| WO | 2005/073937 A | 8/2005 |
| WO | 2005/091434 A1 | 9/2005 |
| WO | 2005/115849 A1 | 12/2005 |
| WO | 2006/045682 A | 5/2006 |
| WO | 2006/048663 A1 | 5/2006 |
| WO | 2006/114821 A1 | 11/2006 |
| WO | 2007/083574 A1 | 7/2007 |
| WO | 2007/083575 A1 | 7/2007 |
| WO | 2007/086130 A1 | 8/2007 |
| WO | 2007/102360 A1 | 9/2007 |
| WO | 2007/119310 A1 | 10/2007 |
| WO | 2007/125683 A1 | 11/2007 |
| WO | 2007/138857 A1 | 12/2007 |
| WO | 2008/007606 A | 1/2008 |
| WO | 2008/081699 A1 | 7/2008 |
| WO | 2008/126458 A1 | 10/2008 |
| WO | 2008/140037 A1 | 11/2008 |
| WO | 2008/142957 A1 | 11/2008 |
| WO | 2009/011376 A1 | 1/2009 |
| WO | 2009/081719 A1 | 7/2009 |
| WO | 2009/110381 A1 | 9/2009 |

OTHER PUBLICATIONS

Kato et al.: "Wireless IC Device and Manufacturing Method Thereof,"; U.S. Appl. No. 12/432,854, filed Apr. 30, 2009.
Official communication issued in counterpart International Application No. PCT/JP2008/058168, mailed Aug. 12, 2008.
Official communication issued in counterpart International Application No. PCT/JP2008/062886, mailed Oct. 21, 2008.
Kato et al.: "Wireless IC Device,"; U.S. Appl. No. 12/469,896, filed May 21, 2009.
Ikemoto et al.: "Wireless IC Device,"; U.S. Appl. No. 12/496,709, filed Jul. 2, 2009.
Official communication issued in counterpart International Application No. PCT/JP2008/062947, mailed Aug. 19, 2008.
Official communication issed in counterpart International Applicationi No. PCT/JP2008/056026, mailed Jul. 1, 2008.
Ikemoto et al.: "Wireless IC Device and Electronic Apparatus,"; U.S. Appl. No. 12/503,188, filed Jul. 15, 2009.
Official communication issued in counterpart International Application No. PCT/JP2008/055567, mailed May 20, 2008.
Official communication issued in counterpart International Application No. PCT/JP2008/051853, mailed Apr. 22, 2008.
Official communication issued in counterpart International Application No. PCT/JP2008/057239, mailed Jul. 22, 2008.
Kimura et al.: "Wireless IC Device,"; U.S. Appl. No. 12/510,338, filed Jul. 28, 2009.
Kato et al.: "Wireless IC Device,"; U.S. Appl. No. 12/510,340, filed Jul. 28, 2009.
Kato: "Wireless IC Device,"; U.S. Appl. No. 12/510,344, filed Jul. 28, 2009.
Kato et al.: "Wireless IC Device,"; U.S. Appl. No. 12/510,347, filed Jul. 28, 2009.
Official communication issued in counterpart European Application No. 08 77 7758, dated on Jun. 30, 2009.
Official communication issued in counterpart Japanese Application No. 2008-103741, mailed on May 26, 2009.
Official communication issued in counterpart Japanese Application No. 2008-103742, mailed on May 26, 2009.
Official communication issued in International Application No. PCT/JP2008/050358, mailed on Mar. 25, 2008.
Official Communication issued in International Application No. PCT/JP2008/050356, mailed on Mar. 25, 2008.
Osamura et al.: "Packaging Material With Electromagnetic Coupling Module,"; U.S. Appl. No. 12/536,663, filed Aug. 6, 2009.
Osamura et al.: "Packaging Material With Electromagnetic Coupling Module,"; U.S. Appl. No. 12/536,669, filed Aug. 6, 2009.
Dokai et al.: "Wireless IC Device and Component for Wireless IC Device,"; U.S. Appl. No. 12/543,553, filed Aug. 19, 2009.
Shioya et al.: "Wireless IC Device,"; U.S. Appl. No. 12/551,037, filed Aug. 31, 2009.
Ikemoto: "Wireless IC Device and Manufacturing Method Thereof,"; U.S. Appl. No. 12/579,672, filed Oct. 15, 2009.
Official communication issued in International Application No. PCT/JP2008/058614, mailed on Jun. 10, 2008.
Official Communication issued in International Application No. PCT/JP2007/066007, mailed on Nov. 27, 2007.
Dokai et al.: "Wireless IC Device and Component for Wireless IC Device"; U.S. Appl. No. 12/359,690, filed Jan. 26, 2009.
Dokai et al.: "Test System For Radio Frequency IC Devices and Method of Manufacturing Radio Frequency IC Devices Using The Same"; U.S. Appl. No. 12/388,826, filed Feb. 19, 2009.
Official Communication issued in International Application No. PCT/JP2008/061955, mailed on Sep. 30, 2008.
Official Communication issued in International Application No. PCT/JP2007/066721, mailed on Nov. 27, 2007.
Official Communication issued in International Application No. PCT/JP2007/070460, mailed on Dec. 11, 2007.
Kato et al.: "Wireless IC Device"; U.S. Appl. No. 12/390,556, filed Feb. 23, 2009.
Kato et al.: "Inductively Coupled Module and Item With Inductively Coupled Module"; U.S. Appl. No. 12/398,497, filed Mar. 5, 2009.
Official Communication issued in International Patent Application No. PCT/JP2008/050945, mailed on May 1, 2008.
Kato et al.: "Article Having Electromagnetic Coupling Module Attached Thereto"; U.S. Appl. No. 12/401,767, filed Mar. 11, 2009.
Taniguchi et al.: "Antenna Device and Radio Frequency IC Device"; U.S. Appl. No. 12/326,117, filed Dec. 2, 2008.
Official Communication issued in International Patent Application No. PCT/JP2008/061442, mailed on Jul. 22, 2008.
Kato et al.: "Container With Electromagnetic Coupling Module"; U.S. Appl. No. 12/426,369, filed Apr. 20, 2009.
Kato: "Wireless IC Device"; U.S. Appl. No. 12/429,346, filed Apr. 24, 2009.
English translation of NL9100176, published on Mar. 2, 1992.
English translation of NL9100347, published on Mar. 2, 1992.
Kato et al.: "Antenna"; U.S. Appl. No. 11/928,502, filed Oct. 30, 2007.
Kato et al.: "Wireless IC Device"; U.S. Appl. No. 12/211,117, filed Sep. 16, 2008.
Kato et al.: "Antenna"; U.S. Appl. No. 11/688,290, filed Mar. 20, 2007.
Kato et al.: "Electromagnetic-Coupling-Module-Attached Article"; U.S. Appl. No. 11/740,509, filed Apr. 26, 2007.
Kato et al.: "Product Including Power Supply Circuit Board"; U.S. Appl. No. 12/234,949, filed Sep. 22, 2008.
Kato et al.: "Data Coupler"; U.S. Appl. No. 12/252,475, filed Oct. 16, 2008.
Kato et al.; "Information Terminal Device"; U.S. Appl. No. 12/267,666, filed Nov. 10, 2008.
Kato et al.: "Wireless IC Device and Wireless IC Device Composite Component"; U.S. Appl. No. 12/276,444, filed Nov. 24, 2008.
Dokai et al.: "Optical Disc"; U.S. Appl. No. 12/326,916, filed Dec. 3, 2008.

(56) References Cited

OTHER PUBLICATIONS

Dokai et al.: "System for Inspecting Electromagnetic Coupling Modules and Radio IC Devices and Method for Manufacturing Electromagnetic Coupling Modules and Radio IC Devices Using the System"; U.S. Appl. No. 12/274,400, filed Nov. 20, 2008.
Kato: "Wireless IC Device"; U.S. Appl. No. 11/964,185, filed Dec. 26, 2007.
Kato et al.: "Radio Frequency IC Device"; U.S. Appl. No. 12/336,629, filed Dec. 17, 2008.
Kato et al.: "Wireless IC Device and Component For Wireless IC Device"; U.S. Appl. No. 12/339,198, filed Dec. 19, 2008.
Ikemoto et al.: "Wireless IC Device"; U.S. Appl. No. 11/851,651, filed Sep. 7, 2007.
Kataya et al.: "Wireless IC Device and Electronic Device"; U.S. Appl. No. 11/851,661, filed Sep. 7, 2007.
Dokai et al.: "Antenna and Radio IC Device"; U.S. Appl. No. 12/350,307, filed Jan. 8, 2009.
Official Communication issued in International Patent Application No. PCT/JP2009/056934, mailed on Jun. 30, 2009.
Kato et al.: "Wireless IC Device"; U.S. Appl. No. 12/903,242, filed Oct. 13, 2010.
Kato et al.: "Wireless IC Device"; U.S. Appl. No. 12/940,103, filed Nov. 5, 2010.
Kato et al.: "Wireless IC Device System and Method of Determining Authenticity of Wireless IC Device"; U.S. Appl. No. 12/940,105, filed Nov. 5, 2010.
Official Communication issued in International Patent Application No. PCT/JP2009/059669, mailed on Aug. 25, 2009.
Official Communication issued in International Patent Application No. PCT/JP2009/062181, mailed on Oct. 13, 2009.
Official Communication issued in corresponding Japanese Application No. 2010-501323, mailed on Apr. 6, 2010.
Kato et al.: "Component of Wireless IC Device and Wireless IC Device"; U.S. Appl. No. 12/944,099, filed Nov. 11, 2010.
Kato et al.: Wireless IC Device and Manufacturing Method Thereof; U.S. Application No. 12/961,599, filed Dec. 7, 2010.
Kataya et al.: "Radio Frequency IC Device and Electronic Apparatus"; U.S. Appl No. 12/959,454, filed Dec. 3, 2010.
Ikemoto et al.:"Radio IC Device"; U.S. Appl. No. 12/981,582, filed Dec. 30, 2010.
Official Communication issued in International Patent Application No. PCT/JP2009/062801, mailed on Oct. 27, 2009.
Ikemoto et al.: "Wireless IC Device and Electronic Apparatus"; U.S. Appl. No. 13/022,695, filed Feb. 8, 2011.
Official Communication issued in International Patent Application No. PCT/JP2009/067778, mailed on Jan. 26, 2010.
Kato: "Wireless IC Device and Method for Manufacturing Same"; U.S. Appl. No. 13/022,693, filed Feb. 8, 2011.
Kato: "Wireless IC Device"; U.S. Appl. No. 13/080,781, filed Apr. 6, 2011.
Official Communication issued in International Patent Application No. PCT/JP2008/063025, mailed on Aug. 12, 2008.
Kato et al.: "Wireless IC Device," U.S. Appl. No. 12/603,608, filed Oct. 22, 2009.
Kato et al.: "Wireless IC Device,"; U.S. Appl. No. 12/688,072, filed Jan. 15, 2010.
Official Communication issued in International Patent Application No. PCl/JP2009/053693, mailed on Jun. 9, 2009.
Kato: "Composite Antenna"; U.S. Appl. No. 12/845,246, filed Jul. 29, 2010.
Official Communication issued in International Patent Application No. PCT/JP2009/053690, mailed on Jun. 2, 2009.
Kato et al.: "Radio Frequency IC Device and Radio Communication System,"; U.S. Appl. No. 12/859,340, filed Aug. 19, 2010.
Official Communication issued in International Patent Application No. PCT/JP2009/055758, mailed on Jun. 23, 2009.

Kato et al.: "Wireless IC Device," ; U.S. Appl. No. 12/859,880, filed Aug. 20, 2010.
Official Communication issued in International Patent Application No. PCT/JP2009/057482, mailed on Jul. 21, 2009.
Kataya et al.: "Wireless IC Device, Electronic Apparatus, and Method for Adjusting Resonant Frequency of Wireless IC Device,"; U.S. Appl. No. 12/861,945, filed Aug. 24, 2010.
Kato: "Wireless IC Device and Electromagnetic Coupling Module,"; U.S. Appl. No. 12/890,895, filed Sep. 27, 2010.
Official Communication issued in International Patent Application No. PCT/JP2009/059410, mailed on Aug. 4, 2009.
Kato et al.: "Wireless IC Device"; U.S. Appl. No. 12/902,174, filed Oct. 12, 2010.
Official Communication issued in International Patent Application No. PCT/JP2009/059259, mailed on Aug. 11, 2009.
Official Communication issued in corresponding Japanese Patent Application No. 2010-506742, mailed on Apr. 6, 2010.
Official Communication issued in International Patent Application No. PCT/JP2009/056698, mailed on Jul. 7, 2009.
Official Communication issued in International Patent Application No. PCT/JP2009/069486, mailed on Mar. 2, 2010.
Kato: "Radio IC Device"; U.S. Appl. No. 13/080,775, filed Apr. 6, 2011.
Kato et al.: "Antenna and Wireless IC Device"; U.S. Appl. No. 13/083,626, filed Apr. 11, 2011.
Official Communication issued in International Patent Application No. PCT/JP2009/070617, mailed on Mar. 16, 2010.
Nagai, "Mounting Technique of RFID by Roll-To-Roll Process", Material Stage, Technical Information Institute Co., LTD, vol. 7, No. 9, 2007, pp. 4-12.
Dokai et al.: "Wireless IC Device"; U.S. Appl. No. 13/088,480, filed Apr. 18, 2011.
Kato et al.: "High-Frequency Device and Wireless IC Device"; U.S. Appl. No. 13/094,928, filed Apr. 27, 2011.
Dokai et al.: "Wireless IC Device"; U.S. Appl. No. 13/099,392, filed May 3, 2011.
Kato et al.: "Radio Frequency IC Device"; U.S. Appl. No. 13/163,803, filed Jun. 20, 2011.
Official Communication issued in International Patent Application No. PCT/JP2010/050170, mailed on Apr. 13, 2010.
Official Communication issued in International Patent Application No. PCT/JP2010/051205, mailed on May 11, 2010.
Kato: "Wireless IC Device, Wireless IC Module and Method of Manufacturing Wireless IC Module"; U.S. Appl. No. 13/169,067, filed Jun. 27, 2011.
Kato et al.: "Antenna and Wireless IC Device"; U.S. Appl. No. 13/190,670, filed Jul. 26, 2011.
Shiroki et al.: "RFIC Chip Mounting Structure"; U.S. Appl. No. 13/223,429, filed Sep. 1, 2011.
Official communication issued in Japanese Application No. 2007-531524, mailed on Sep. 11, 2007.
Official communication issued in Japanese Application No. 2007-531525, mailed on Sep. 25, 2007.
Official communication issued in Japanese Application No. 2007-531524, mailed on Dec. 12, 2007.
Official communication issued in European Application No. 07706650.4, mailed on Nov. 24, 2008.
Mukku-Sha, "Musen IC Tagu Katsuyo-no Subete" "(All About Wireless IC Tags"), RFID, pp. 112-126.
Dokai et al.: "Wireless IC Device and Component for Wireless IC Device"; U.S. Appl. No. 11/624,382, filed Jan. 18, 2007.
Dokai et al.: "Wireless IC Device, and Component for Wireless IC Device"; U.S. Appl. No. 11/930,818, filed Oct. 31, 2007.
Kato et al.: "Wireless IC Device"; U.S. Appl. No. 12/042,399, filed Mar. 5, 2008.
Official communication issued in related U.S. Appl. No. 12/042,399; mailed on Aug. 25, 2008.

* cited by examiner

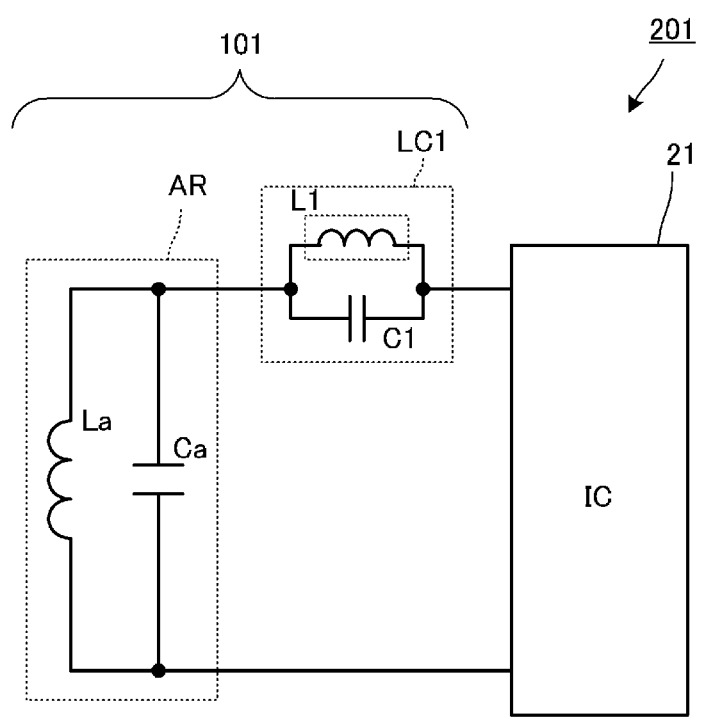

ANTENNA DEVICE AND RADIO FREQUENCY IC DEVICE

BACKGROUND OF THE INVENTION

1. Field of the Invention

The present invention relates to an antenna device used in a radio frequency IC device such as an RFID device that performs contactless communication by near-field transmission and a radio frequency IC device including the antenna device.

2. Description of the Related Art

Japanese Unexamined Patent Application Publication No. 2001-010264 discloses a contactless IC card used as an RFID device. FIG. 1 illustrates an equivalent circuit of the contactless IC card disclosed in Japanese Unexamined Patent Application Publication No. 2001-010264. This contactless IC card performs contactless communication with a reader/writer. A parallel resonance circuit is provided for a radio frequency IC chip 11. The parallel resonance circuit includes an inductor L provided by an antenna coil 13, a resistor R for the entire circuit, an adjusting resistor 14, a capacitor C for the entire circuit which has a capacitance based on the IC chip and a stray capacitance occurring in the circuit, and an adjusting capacitor having a capacitance Cad.

In order to obtain a good state of communication, the sharpness (Q) of the resonance circuit is controlled by controlling a resistance value Rad of the adjusting resistor 14 included in the resonance circuit and a resonance frequency is controlled by the capacitance Cad of an adjusting capacitor 15.

When such an IC card moves closer to a reader/writer so as to communicate with the reader/writer, however, antenna coils included in both of them are coupled and the inductance values of the antenna coils are changed. As a result, the resonance frequencies of the resonance circuits including the antenna coils are changed and gains are significantly changed.

FIGS. 2A-2C are diagrams illustrating the above-described situation. A resonance circuit 31 including an antenna coil Lr and a capacitor Cr is provided in a reader/writer 300. A resonance circuit including an antenna coil La and a capacitor Ca is formed in a radio frequency IC device 200, and is connected to a radio frequency IC 21.

An S11 characteristic (return loss) is represented by a characteristic curve Ra in FIG. 2C. The S11 characteristic is an S-parameter and is obtained when the antenna device is observed from the radio frequency IC 21 included in the radio frequency IC device 200. The return loss reaches its peak at a frequency foa when the radio frequency IC device 200 is located at an appropriate distance from the reader/writer 300.

On the other hand, as illustrated in FIG. 2B, if the radio frequency IC device 200 is excessively close to the reader/writer 300, the antenna coil La included in the radio frequency IC device 200 and the antenna coil Lr included in the reader/writer 300 are magnetically coupled and the inductances of both of them are increased. Accordingly, as illustrated in FIG. 2C using a characteristic curve Rb, the return loss reaches its peak at a frequency fob lower than the frequency foa.

Under the above-described condition in which the antenna included in the radio frequency IC device 200 and the antenna included in the reader/writer 300 are coupled by near-field transmission, as both of them get closer to each other, the resonance frequencies of both of the antennas are shifted in the direction of a lower frequency. If this antenna resonance frequency is lower than a frequency used by the radio frequency IC device 200 (that is, a communication frequency represented by a symbol fs in FIG. 2C), the antenna coil cannot function as an inductor and an antenna gain is significantly reduced. Consequently, communication cannot be performed.

In the conventional art, in order to prevent the resonance frequency from being lower than the communication frequency even if the resonance frequency is shifted in the direction of a lower frequency, it is required that the resonance frequency of the antenna device be set to a frequency that is 10 to 20 percent higher than the communication frequency in advance. Furthermore, in order to make communication possible even under the condition in which the resonance frequency is higher than the communication frequency, it is required that the value Q of a resonance circuit including an antenna coil be set to a low value by disposing a resistor in the resonance circuit as illustrated in FIG. 1.

However, under the conditions allowing the radio frequency IC device 200 to communicate with the reader/writer 300 even if they are excessively close to each other, a resonance frequency of an antenna of the radio frequency IC device 200, which is obtained when the distance therebetween is normal, is shifted to a direction of a frequency higher than the communication frequency. Accordingly, if the distance between the radio frequency IC device 200 and the reader/writer 300 is larger than the normal distance, antenna gains are significantly reduced. Consequently, a sufficient communication distance cannot be obtained.

Furthermore, when the value Q of the resonance frequency including an antenna coil is set to a lower value, a relatively stable gain can be obtained with the broad characteristics of the resonance circuit even if the resonance frequency is shifted. On the other hand, however, since the value Q is set to a lower value, a gain is lowered regardless of the distance between the radio frequency IC device and the reader/writer.

SUMMARY OF THE INVENTION

Preferred embodiments of the present invention provide an antenna device in which the characteristics thereof are not significantly changed despite the influence of changes in the distance between a radio frequency IC device and a reader/writer and also provide a radio frequency IC device capable of achieving communication with high reliability.

An antenna device according to a preferred embodiment of the present invention includes an antenna coil arranged to transmit or receive a radio frequency communication signal to or from an external device, and an additional resonance circuit that is connected to the antenna resonance circuit, including at least one inductor, and that has a resonance frequency characteristic different from that of the antenna resonance circuit.

In the above-described configuration, for example, the resonance frequency of the additional resonance circuit is preferably set to a frequency lower than the resonance frequency of the antenna resonance circuit. As a result, the decrease in the resonance frequency of the antenna resonance circuit can be minimized and prevented by the resonance frequency of the additional resonance circuit even if a radio frequency IC device moves closer to the external device such as a reader/writer, antenna coils included both of them are magnetically coupled, and inductance values are thereby increased. Consequently, the amount of change in the resonance frequency of the antenna resonance circuit is reduced and a high gain can be stably obtained.

Conversely, the resonance frequency of the additional resonance circuit is preferably set to a frequency higher than the resonance frequency of the antenna resonance circuit, and is preferably set such that the resonance frequency of the antenna resonance circuit is higher than a communication frequency even in the condition in which the radio frequency IC device is excessively close to the reader/writer (the external device). As a result, even if the radio frequency IC device moves away from the reader/writer, an increase in the resonance frequency of the antenna resonance circuit (movement of it to the resonance frequency of the additional resonance circuit) can be prevented and minimized. Consequently, the amount of the change in the resonance frequency of the antenna resonance circuit is reduced, and the condition in which the resonance frequency of the antenna resonance circuit is near the communication frequency can be maintained over a wide communication range.

A magnetic field coupling between the antenna coil and the inductor included in the additional resonance circuit may be achieved. As a result, even if the resonance frequency of the antenna resonance circuit moves closer to the resonance circuit of the additional resonance circuit in accordance with the increase in an inductance value, it cannot easily jump over the resonance frequency of the additional resonance circuit. This can enhance the stability of the resonance frequency of the antenna resonance circuit.

The additional resonance circuit is, for example, a parallel resonance circuit. As a result, the inductance value of the additional resonance circuit can be a small value. This leads to the miniaturization of the additional resonance circuit.

For example, the antenna resonance circuit is connected in series to the additional resonance circuit. As a result, the magnetic field coupling between the antenna coil included in the antenna resonance circuit and the inductor included in the additional resonance circuit can be more easily achieved.

In particular, the resonance frequency of the antenna resonance circuit is preferably set to a frequency higher than a frequency used by the radio frequency IC device (a communication frequency), and the resonance frequency of the additional resonance circuit is set to a frequency lower than the communication frequency. As a result, as the radio frequency IC device including the antenna device moves closer to the external device such as a reader/writer, the resonance frequency of the antenna resonance circuit moves closer to the communication frequency. A higher gain can be therefore obtained.

For example, inductors included in the additional resonance circuits may individually include two adjacent lines of different lengths.

In this configuration, the range of resonance frequencies of the additional resonance circuits can be broadened. The effects of minimizing and preventing the change in the resonance frequency of the antenna resonance circuit can be enhanced by using the additional resonance circuits.

The inductor included in the additional resonance circuit may be magnetically shielded. As a result, even if the radio frequency IC device including the antenna device moves closer to the external device such as a reader/writer, the magnetic field coupling between the antenna device and the antenna coil included in the external device can be prevented. Accordingly, the inductance value of the inductor included in the additional resonance circuit is not changed. This can stabilize the resonance frequency of the additional resonance circuit. The resonance frequency of the antenna resonance circuit can be further stabilized.

The additional resonance circuit may be provided in a multilayer substrate including a magnetic substance. As a result, a thin device can be obtained, and the upsizing of the device due to the installation of the additional resonance circuit can be prevented. Furthermore, magnetic shielding can be simultaneously performed.

An output inductor may be connected in series to an input portion for receiving a signal transmitted from a radio frequency IC and may be provided in the multilayer substrate. As a result, an impedance matching circuit including the radio frequency IC and the antenna device is simultaneously provided in the multilayer substrate. The device can therefore be further miniaturized.

The capacitance component of the additional resonance circuit may be a chip capacitor and may be disposed on a surface of the multilayer substrate or in the multilayer substrate. As a result, the multilayer substrate can be further miniaturized, and an area required for the multilayer substrate can be reduced in the radio frequency IC device.

A radio frequency IC device according to a preferred embodiment of the present invention includes an antenna device including a multilayer substrate and a radio frequency IC chip disposed on a surface of the multilayer substrate or in the multilayer substrate. As a result, a module (an RFID module) including a radio frequency IC chip can be provided. The installation of the antenna device and the radio frequency IC in the radio frequency IC device can be easily performed.

According to a preferred embodiment of the present invention, a decrease in the resonance frequency of the antenna resonance circuit can be minimized and prevented by the resonance frequency of the additional resonance circuit even if the radio frequency IC device moves closer to the external device such as a reader/writer, antenna coils included both of them are magnetically coupled, and inductance values are therefore increased. Consequently, the amount of change in the resonance frequency of the antenna resonance circuit is reduced and a high gain can be stably obtained.

Conversely, even if the radio frequency IC device moves away from the external device, the change in the resonance frequency of the antenna resonance circuit can be minimized and prevented. Consequently, the condition in which the resonance frequency of the antenna resonance circuit is near the communication frequency can be maintained over a wide communication range.

Other features, elements, steps, characteristics and advantages of the present invention will become more apparent from the following detailed description of preferred embodiments of the present invention with reference to the attached drawings.

BRIEF DESCRIPTION OF THE DRAWINGS

FIG. 3 is a circuit diagram illustrating configurations of a radio frequency IC device according to a first preferred embodiment and an antenna device according to the first preferred embodiment of the present invention.

DETAILED DESCRIPTION OF THE PREFERRED EMBODIMENTS

First Preferred Embodiment

FIG. 3 is a circuit diagram of a radio frequency IC device 201 according to the first preferred embodiment. Referring to FIG. 3, an antenna resonance circuit AR including an antenna coil La and a capacitor Ca and an additional resonance circuit LC1 including a parallel circuit of an inductor L1 and a capacitor C1 are formed. The additional resonance circuit LC1 is connected in series to the antenna resonance circuit AR and is connected to a radio frequency IC 21.

An antenna device 101 preferably includes the antenna resonance circuit AR and the additional resonance circuit LC1. The radio frequency IC device 201 preferably includes the antenna device 101 and the radio frequency IC 21.

The radio frequency IC device 201 is, for example, an RFID card. The antenna coil La has a spiral conductor pattern inside the card. The conductor pattern has a plurality of turns and is located along the periphery of the card. The capacitor Ca includes opposite electrodes between which a dielectric layer is sandwiched. The inductor L1 and the capacitor C1 are provided in a ferrite multilayer substrate. This ferrite multilayer substrate and the radio frequency IC 21 are sealed in the card, whereby a single RFID card is provided.

Figure 4A:
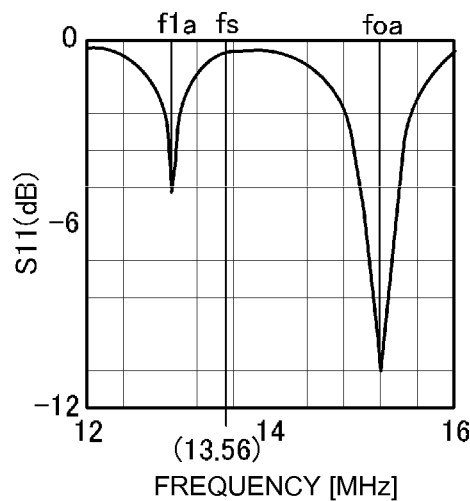
FIGS. 4A and 4B are diagrams illustrating S11 characteristics (return losses) obtained when the distance between a radio frequency IC device according to the first preferred embodiment and a reader/writer is changed.
Figure 4B:
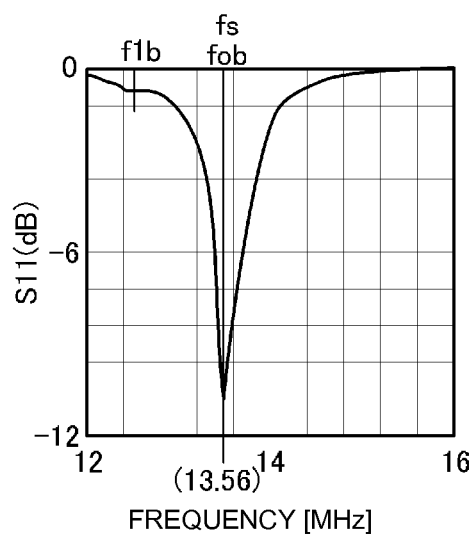
Figure 5A:
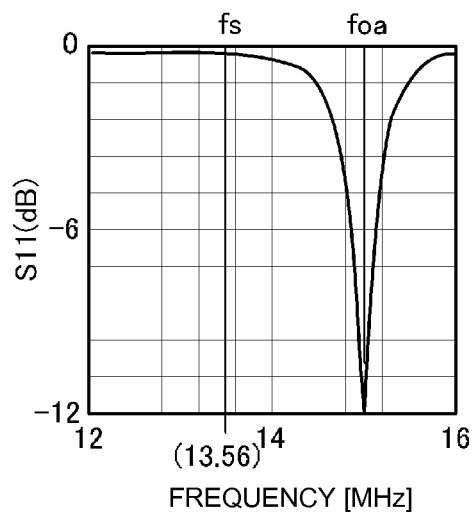
FIGS. 5A and 5B are diagrams illustrating S11 characteristics (return losses) obtained when the distance between a radio frequency IC device, which is a comparative example of the first preferred embodiment, and a reader/writer is changed.
Figure 5B:
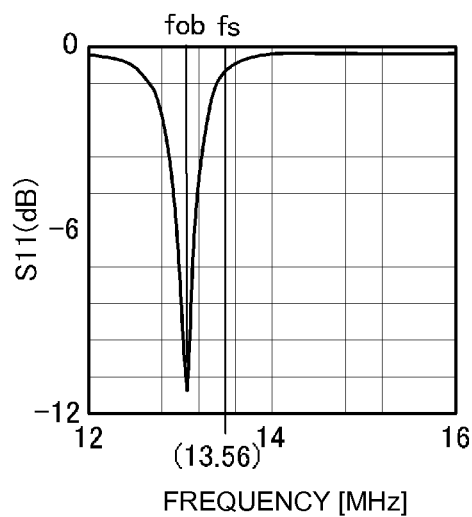

FIGS. 4A and 4B are diagrams illustrating the antenna characteristics of the antenna device 101 illustrated in FIG. 3. FIGS. 5A and 5B are diagrams illustrating the antenna characteristics of an antenna device that does not include the additional resonance circuit LC1. In the drawings, the S11 characteristic (return loss), which is an S-parameter, is illustrated.

Each of FIGS. 4A and 5A illustrate a characteristic obtained in a normal condition in which the radio frequency IC device 201 is located at an appropriate distance from a reader/writer, and Each of FIGS. 4B and 5B illustrate a characteristic obtained in a condition in which both of them are excessively close to each other.

If the additional resonance circuit LC1 illustrated in FIG. 3 is not included, as illustrated in FIG. 5A, a resonance frequency foa of the antenna resonance circuit AR is approximately 15.0 MHz in the normal condition in which the radio frequency IC device is located at an appropriate distance from the reader/writer. That is, the resonance frequency foa is set to a frequency higher than a communication frequency fs (for example, 13.56 MHz). Since the resonance frequency foa of the antenna resonance circuit AR is higher than the communication frequency fs as described previously, the magnetic field coupling between the antenna device of the radio frequency IC device and the antenna of the reader/writer can be achieved and communication between them can be performed.

However, in a condition where the antenna of the radio frequency IC device and the antenna of the reader/writer are excessively close to each other, as illustrated in FIG. 5B, a resonance frequency fob of the antenna resonance circuit AR is lower than the communication frequency fs. At that time, the antenna device of the radio frequency IC device and the antenna of the reader/writer are capacitively coupled to each other. Since the magnetic field coupling between them cannot be achieved using an antenna coil included in the antenna resonance circuit (a current does not flow through the antenna coil), communication between them cannot be performed.

On the other hand, if the antenna device 101 according to the first preferred embodiment is used, a resonance frequency fla of the additional resonance circuit LC1 is approximately 12.9 MHz and the resonance frequency foa of the antenna resonance circuit AR is approximately 15.2 MHz in the normal condition as illustrated in FIG. 4A. Since the resonance frequency foa is higher than the communication frequency of 13.56 MHz and is relatively near to the communication frequency, the radio frequency IC device 201 can communicate with the reader/writer.

In the condition in which the radio frequency IC device 201 is excessively close to the reader/writer, as illustrated in FIG. 4B, the resonance frequency fob of the antenna resonance circuit is 13.56 MHz that is almost the same as the communication frequency fs. Accordingly, the strong magnetic field coupling between the antenna device 101 of the radio frequency IC device 201 and the antenna of the reader/writer is achieved, and therefore they can normally communicate with each other.

As illustrated in FIG. 4B, a resonance frequency flb of the additional resonance circuit LC1 is shifted in a direction of a lower frequency in accordance with the decrease in the resonance frequency fob of the antenna resonance circuit AR.

Figure 6A:
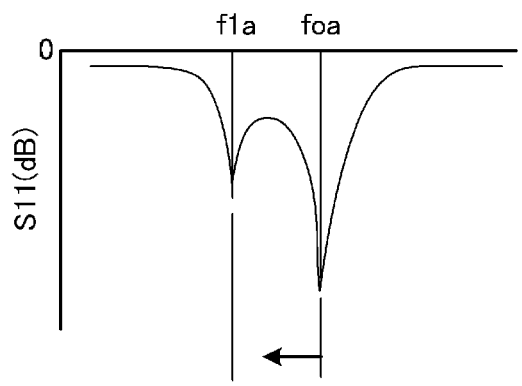
FIGS. 6A-6C are diagrams illustrating the relationship between the resonance frequency of an additional resonance circuit and the decrease in the resonance frequency of an antenna resonance circuit which is caused by the magnetic field coupling between the antenna resonance circuit and the antenna of a reader/writer.

Next, the relationship between the resonance frequency of the additional resonance circuit LC1 and the decrease in the resonance frequency of the antenna resonance circuit AR, which is caused by magnetic field coupling between the antenna resonance circuit AR and the antenna of the reader/writer, will be described with reference to FIGS. 6A-6C. In a condition in which the radio frequency IC device 201 can communicate with the reader/writer and is furthest from the reader/writer, as illustrated in FIG. 6A, the resonance frequency foa of the antenna resonance circuit AR is higher than the resonance frequency fla of the additional resonance circuit LC1 and is relatively far from the resonance frequency fla.

Figure 6B:
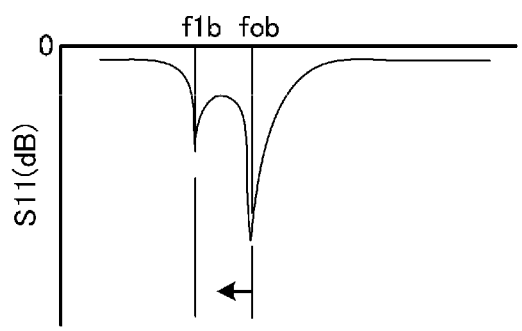

As the radio frequency IC device 201 moves closer to the reader/writer, as illustrated in FIG. 6B, the resonance frequency fob of the antenna resonance circuit is lowered from the resonance frequency foa of the antenna resonance circuit AR. In accordance with this, the resonance frequency flb of the additional resonance circuit LC1 is slightly shifted in a direction of a frequency lower than the resonance frequency foa. However, the amount of this shift is smaller than that of the resonance frequency of the antenna resonance circuit AR (foa–fob).

Thus, the additional resonance circuit LC1 prevents the resonance frequency of the antenna resonance circuit AR from becoming lower than the resonance frequency flb thereof.

Figure 6C:
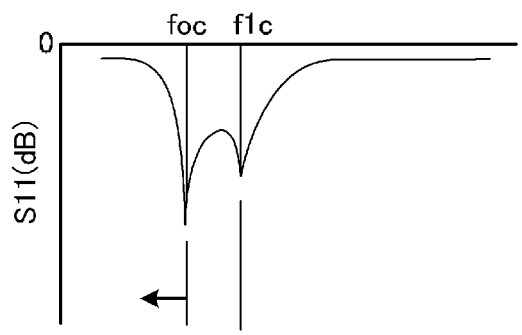

If a stronger magnetic field coupling between the antenna coil La included in the radio frequency IC device 201 and the antenna coil included in the reader/writer is achieved and the resonance frequency of the antenna resonance circuit is further lowered, as illustrated in FIG. 6C using a symbol foc, the resonance frequency of the antenna resonance circuit jumps over a resonance frequency flc of the additional resonance circuit LC1 in a direction of a frequency lower than the resonance frequency flc. That is, the additional resonance circuit LC1 prevents the resonance frequency of the antenna resonance circuit from jumping over the resonance frequency thereof. Accordingly, the resonance frequency of the additional resonance circuit LC1 is set such that the resonance frequency of the antenna resonance circuit AR does not jump over the resonance frequency of the additional resonance circuit LC1. That is, the resonance frequency of the additional resonance circuit LC1 is determined such that the state illustrated in FIG. 6C can be prevented even in the condition in which the radio frequency IC device is nearest to the reader/writer.

Figure 1:
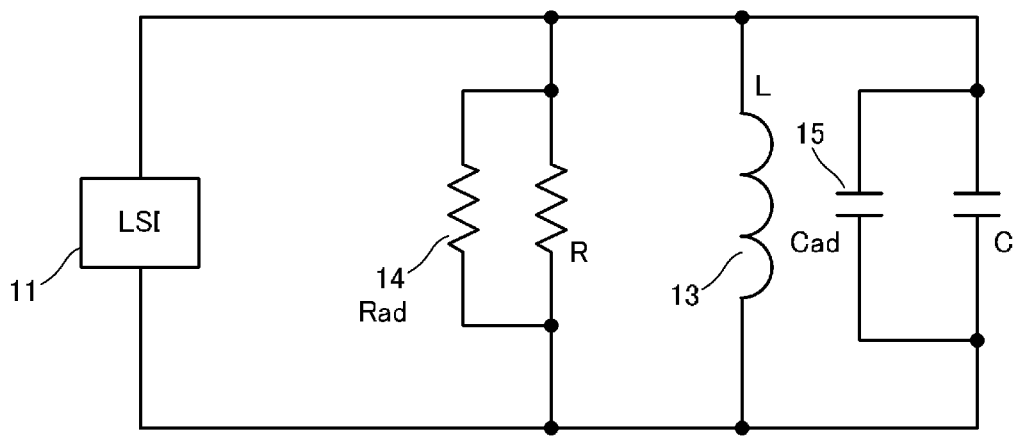
FIG. 1 is a circuit diagram of a contactless IC card described in Japanese Unexamined Patent Application Publication No. 2001-010264.
Figure 2A:
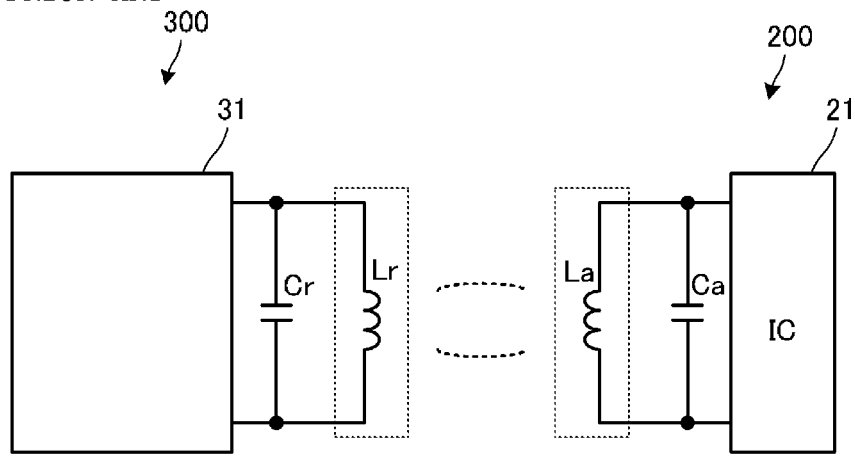
FIGS. 2A-2C are diagrams describing a problem of a radio frequency IC device in the related art.
Figure 2B:
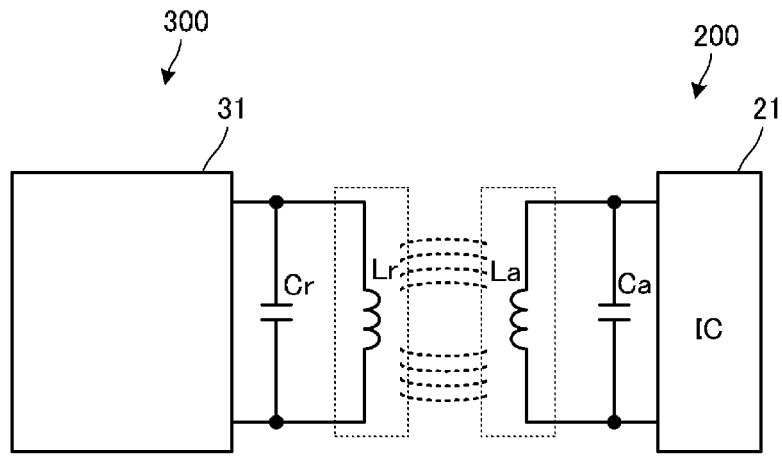
Figure 2C:
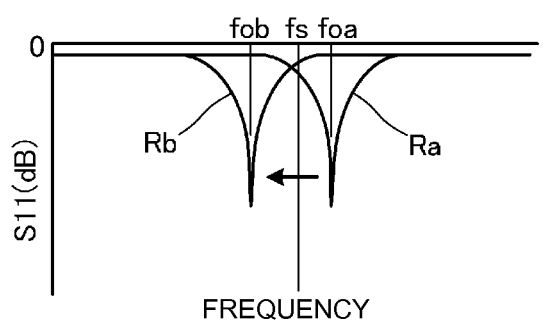

FIGS. 7A, 7B, 8A, and 8B are Smith charts illustrating changes in impedance with respect to changes in frequency which are obtained in the antenna device 101 used in a radio frequency IC device according to the first preferred embodiment illustrated in FIG. 1 and in an antenna device that does not include the additional resonance circuit LC1.

Figure 7A:
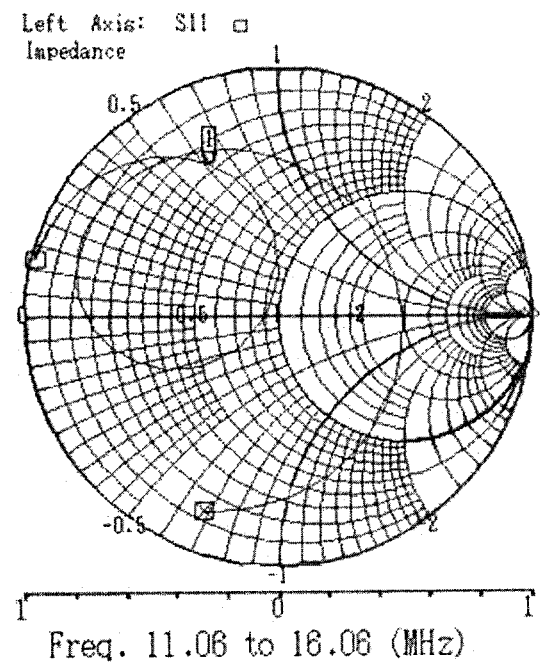
FIGS. 7A and 7B are diagrams illustrating impedance loci of an antenna device which are obtained when a frequency is changed in different conditions of the distance between a radio frequency IC device according to the first preferred embodiment and a reader/writer.
Figure 7B:
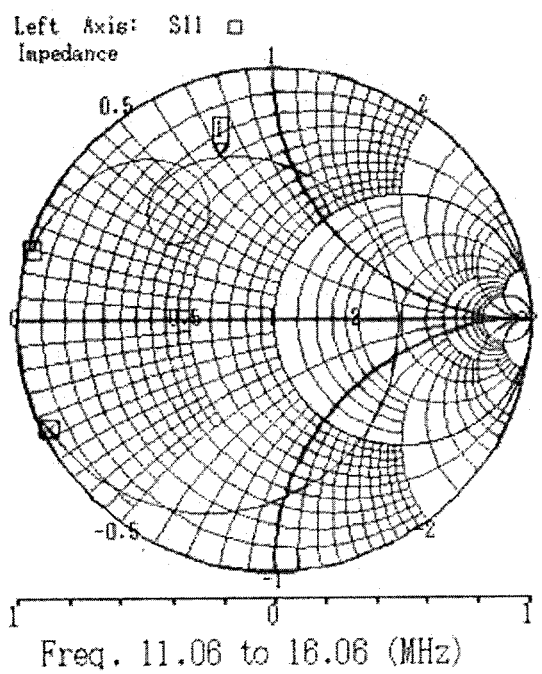
Figure 8A:
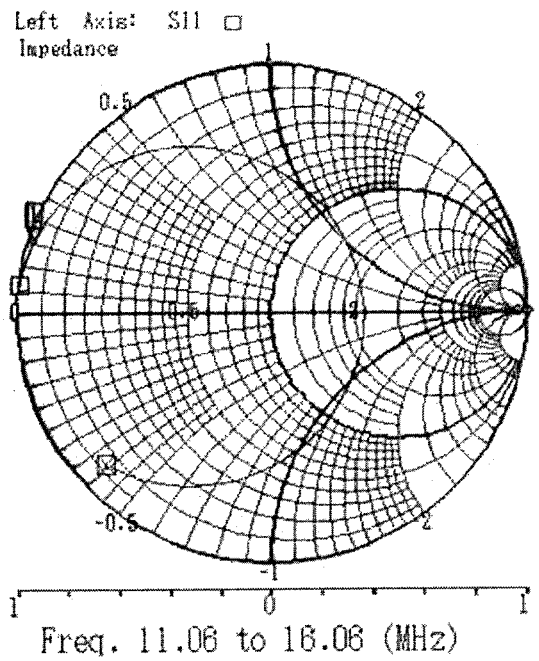
FIGS. 8A and 8B are diagrams illustrating impedance loci of an antenna device which are obtained when a frequency is changed in different conditions of the distance between a radio frequency IC device, which is a comparative example of the first preferred embodiment, and a reader/writer.
Figure 8B:
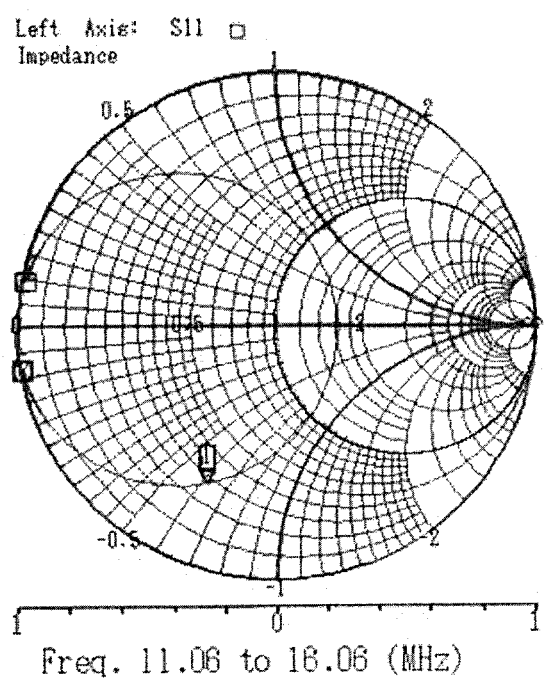

FIGS. 7A and 7B illustrate a characteristic of the antenna device 101 illustrated in FIG. 3. FIGS. 8A and 8B illustrate a characteristic of an antenna device that does not include the additional resonance circuit LC1. FIGS. 7A and 8A represent a characteristic in a normal condition in which the radio frequency IC device 201 is located at an appropriate distance from a reader/writer, and FIGS. 7B and 8B represent a characteristic in a condition in which both of them are excessively close to each other. A frequency is changed in a range of about 11.06 to about 16.06 MHz, for example. Furthermore, an impedance at a communication frequency of about 13.56 MHz is represented using a marker [1].

If the additional resonance circuit LC1 is not included, as illustrated in FIGS. 8A and 8B, the impedance at the communication frequency of about 13.56 MHz (the position of the marker [1] in the drawing) exists in the lower half of the Smith chart in the condition in which the radio frequency IC device is excessively close to the reader/writer. That is, the antennas of both of them are capacitively coupled, and a current does not flow through the antenna coil La included in the antenna device. Consequently, communication cannot be performed.

On the other hand, in the antenna device 101 according to the first preferred embodiment, the impedance at the communication frequency of about 13.56 MHz (the position of the marker [1] in the drawings) exists in the upper half of each of the Smith charts regardless of whether the radio frequency IC device is located at an appropriate distance from the reader/writer or is excessively close to the reader/writer. That is, it can be understood that the impedance represents inductivity and the magnetic field coupling between the antennas of both of them is achieved.

Thus, the radio frequency IC device 201 can stably communicate with the reader/writer even if the distance between them is changed.

The magnetic field coupling between the antenna coil La and the inductor L1 included in the additional resonance circuit LC1, which are illustrated in FIG. 3, may be achieved. As a result, the effect of reducing the amount of shift of the resonance frequency of the antenna resonance circuit AR in a direction of the resonance frequency of the additional resonance circuit LC1 is enhanced. This can further stabilize the resonance frequency of the antenna resonance circuit AR.

Second Preferred Embodiment

In the first preferred embodiment, the resonance frequency of the antenna resonance circuit AR is preferably set to a frequency higher than the communication frequency fs, and the resonance frequency of the additional resonance circuit LC1 is preferably set to a frequency lower than the resonance frequency of the antenna resonance circuit AR. In the second preferred embodiment, an example in which the resonance frequency of the additional resonance circuit LC1 is preferably set to a frequency higher than the resonance frequency of the antenna resonance circuit AR will be described.

Figure 9A:
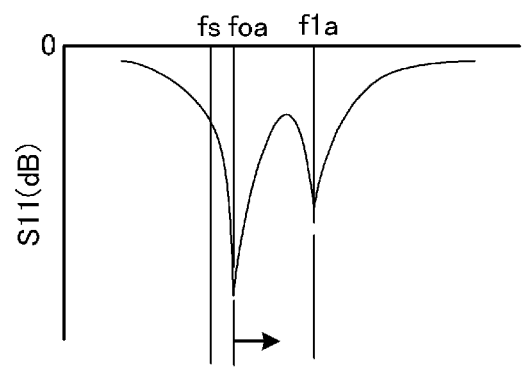
FIGS. 9A and 9B are diagrams illustrating S11 characteristics of an antenna device included in a radio frequency IC device according to a second preferred embodiment which are obtained when the distance between the radio frequency IC device and a reader/writer is changed.
Figure 9B:
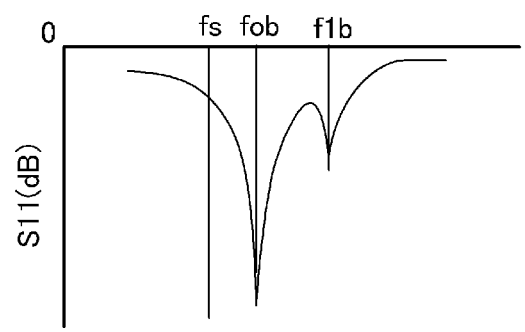

FIGS. 9A and 9B illustrate an S11 characteristic of an antenna device included in a radio frequency IC device which is changed in accordance with the change in the distance between the radio frequency IC device and a reader/writer. FIG. 9A illustrates a characteristic obtained in the condition in which the radio frequency IC device is excessively close to the reader/writer. In this condition, the resonance frequency foa of the antenna resonance circuit is set to a frequency higher than the communication frequency fs.

In the condition in which the radio frequency IC device is located at an appropriate distance from the reader/writer, the magnetic field coupling between both of the antennas of the radio frequency IC device and the reader/writer is weak. Accordingly, as illustrated in FIG. 9B, the inductance of the antenna coil included in the antenna resonance circuit becomes small and the resonance frequency fob is increased. However, the resonance frequency fob of the antenna resonance circuit does not become significantly higher than the communication frequency fs, since the resonance frequency flb of the additional resonance circuit is used for suppression of the increase in the resonance frequency fob of the antenna resonance circuit.

Thus, the radio frequency IC device can stably communicate with the reader/writer even if the distance between them is changed.

Third Preferred Embodiment

Next, some examples of the configuration of the additional resonance circuit will be described as the third preferred embodiment with reference to FIGS. 10A, 10B, 10C, 10D, and 11.

Figure 10A:
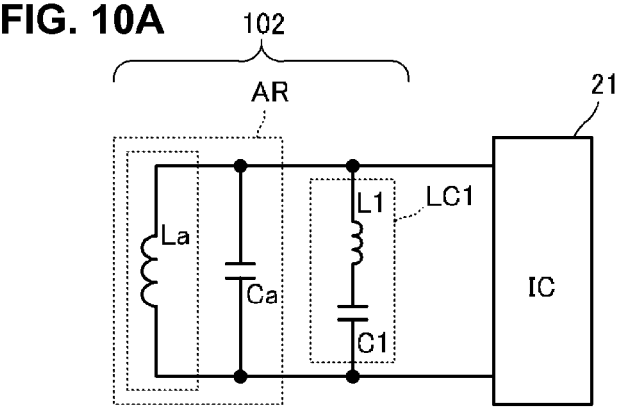
FIGS. 10A-10D are diagrams illustrating a configuration of a radio frequency IC device according to a third preferred embodiment of the present invention.

In an example illustrated in FIG. 10A, the additional resonance circuit LC1 that includes a series circuit of the inductor L1 and the capacitor C1 is connected in parallel to the antenna resonance circuit AR, whereby an antenna device 102 is provided.

Figure 10B:
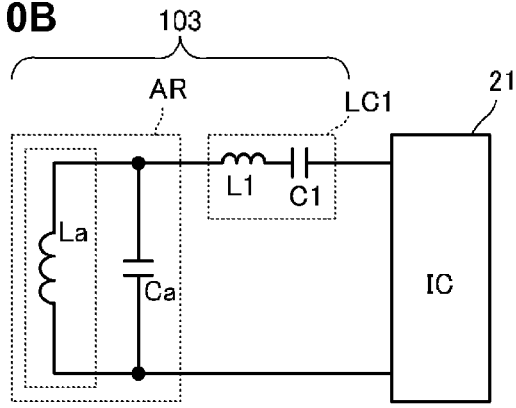

In an example illustrated in FIG. 10B, the additional resonance circuit LC1 that includes a series circuit of the inductor L1 and the capacitor C1 is connected in series to the antenna resonance circuit AR, whereby an antenna device 103 is provided.

Figure 10C:
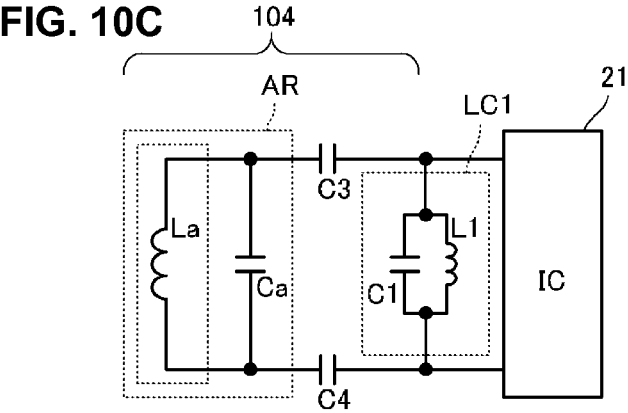

In an example illustrated in FIG. 10C, the additional resonance circuit LC1 that includes a parallel circuit of the inductor L1 and the capacitor C1 is connected in parallel to the antenna resonance circuit AR via capacitors C3 and C4, whereby an antenna device 104 is provided. In the above examples, a plurality of additional resonance circuits LC1 may be included.

Figure 10D:
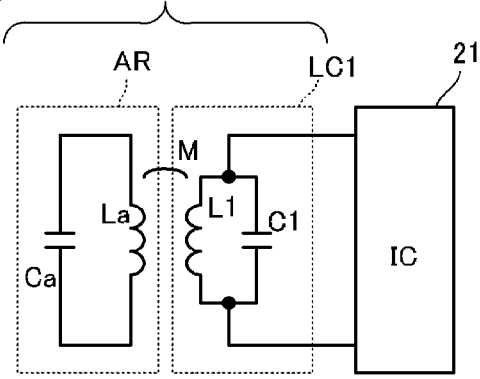
Figure 11:
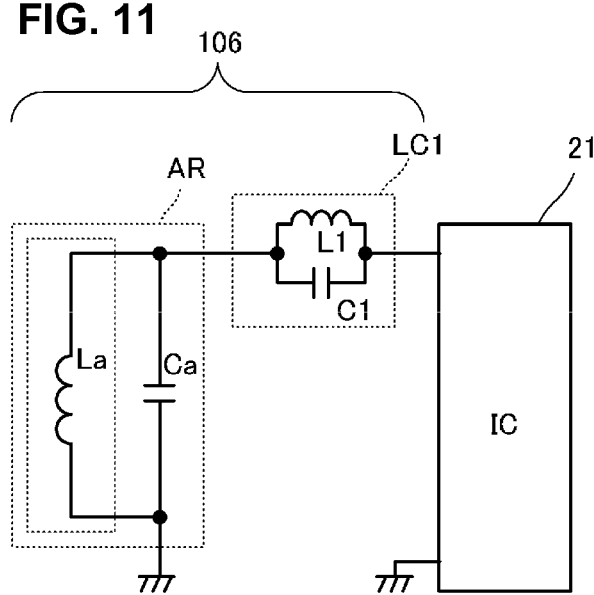
FIG. 11 is a diagram illustrating an exemplary unbalanced antenna device according to a third preferred embodiment and an exemplary radio frequency IC device according to the third preferred embodiment of the present invention.

In an example illustrated in FIG. 10D, the antenna resonance circuit AR preferably includes a parallel circuit of the antenna coil La and the capacitor Ca, the additional resonance circuit LC1 preferably includes a parallel circuit of the inductor L1 and the capacitor C1, and the additional resonance circuit LC1 is connected to the radio frequency IC 21. The antenna coil La and the inductor L1 are disposed such that the antenna coil La is magnetically coupled to the inductor L1, whereby an antenna device 105 is provided. Thus, the antenna resonance circuit AR and the additional resonance circuit LC1 may be inductively coupled.

In the configurations illustrated in FIGS. 10A to 10C, the magnetic field coupling between the antenna coil La and the inductor L1 included in the additional resonance circuit LC1 may also be achieved. As a result, as described previously, the effect of reducing the amount of shift of the resonance frequency of the antenna resonance circuit AR in a direction of the resonance frequency of the additional resonance circuit LC1 is enhanced. This can further stabilize the resonance frequency of the antenna resonance circuit AR.

In the above-described examples of the third preferred embodiment, the radio frequency IC 21 is a balanced IC arranged to receive or output a signal, and the antenna device is therefore also a balanced antenna device. In an example of the third preferred embodiment illustrated in FIG. 11, however, the radio frequency IC 21 is an unbalanced IC arranged to receive or output a signal, and an antenna device 106 is also an unbalanced antenna device. In this example, the additional resonance circuit LC1 in which the inductor L1 and the capacitor C1 are connected in parallel is connected in series to the antenna resonance circuit AR. Like the case of the balanced antenna device, there are other configurations of the additional resonance circuit LC1 and other configurations of a connection between the additional resonance circuit LC1 and the antenna resonance circuit AR. For example, one of the lines illustrated in FIG. 10A may be connected to the ground.

Fourth Preferred Embodiment

The fourth preferred embodiment is an example in which the stability of the resonance frequency of the antenna resonance circuit is further enhanced using two additional resonance circuits.

Figure 12:
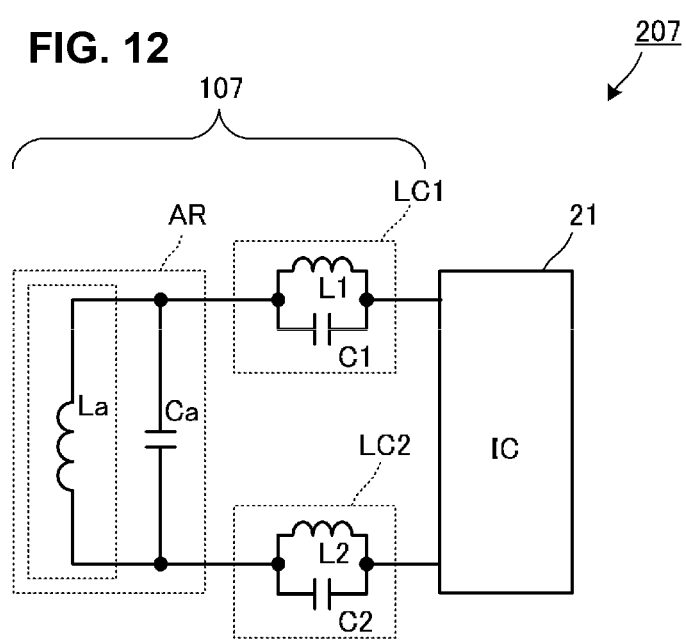
FIG. 12 is a circuit diagram of an antenna device according to a fourth preferred embodiment and a radio frequency IC device including the antenna device.

FIG. 12 is a circuit diagram of a radio frequency IC device 207 including an antenna device 107 according to the fourth preferred embodiment. In this example, the first additional resonance circuit LC1 including the parallel circuit of the inductor L1 and the capacitor C1 and a second additional resonance circuit LC2 including the parallel circuit of an inductor L2 and a capacitor C2 are connected in series to the antenna resonance circuit AR, whereby the antenna device 107 is provided.

Figure 13:
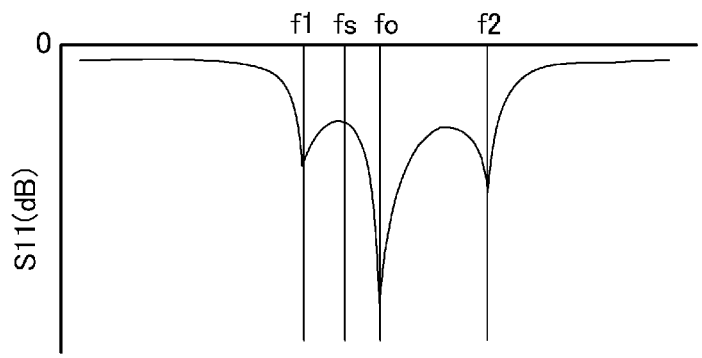
FIG. 13 is a diagram illustrating an S11 characteristic of an antenna device according to the fourth preferred embodiment of the present invention.

FIG. 13 is a diagram illustrating an S11 characteristic of the antenna device 107 illustrated in FIG. 12. A resonance frequency f1 of the first additional resonance circuit LC1 is set to a frequency lower than a resonance frequency fo of the antenna resonance circuit AR. A resonance frequency f2 of the second additional resonance circuit LC2 is set to a frequency higher than the resonance frequency fo of the antenna resonance circuit. The resonance frequency fo of the antenna resonance circuit AR is set to a frequency higher than the communication frequency fs.

As the radio frequency IC device according to the fourth preferred embodiment moves closer to a reader/writer, the resonance frequency fo of the antenna resonance circuit is lowered. However, the additional resonance circuit LC1 reduces the amount of the shift of the resonance frequency fo of the antenna resonance circuit in a direction of a lower frequency. The resonance frequencies fo and f1 are determined such that the resonance frequency fo does not jump over the communication frequency fs even in the condition in which the radio frequency IC device is excessively close to the reader/writer. If the radio frequency IC device moves apart from the reader/writer, the resonance frequency fo of the antenna resonance circuit is shifted in a direction of a higher frequency. However, the shift amount is reduced by the second additional resonance circuit LC2. Accordingly, the resonance frequency fo of the antenna resonance circuit AR can always be in the vicinity of the communication frequency fs regardless of the distance between the radio frequency IC device and the reader/writer. Thus, by disposing at least two additional resonance frequency circuits, the resonance frequency of the antenna resonance circuit can be stabilized in both of the direction of a lower frequency and the direction of a higher frequency.

As another example, both of the resonance frequencies of the two additional resonance circuits may exist on the side of a frequency lower or higher than the resonance frequency of the antenna resonance circuit. In this case, as compared with the case in which only a single additional resonance circuit is disposed, the stability of the resonance frequency of the antenna resonance circuit is further enhanced.

In each of the circuit configurations illustrated in FIGS. 10A-10D, two or more additional resonance circuits may be similarly disposed.

Fifth Preferred Embodiment

Figure 14A:
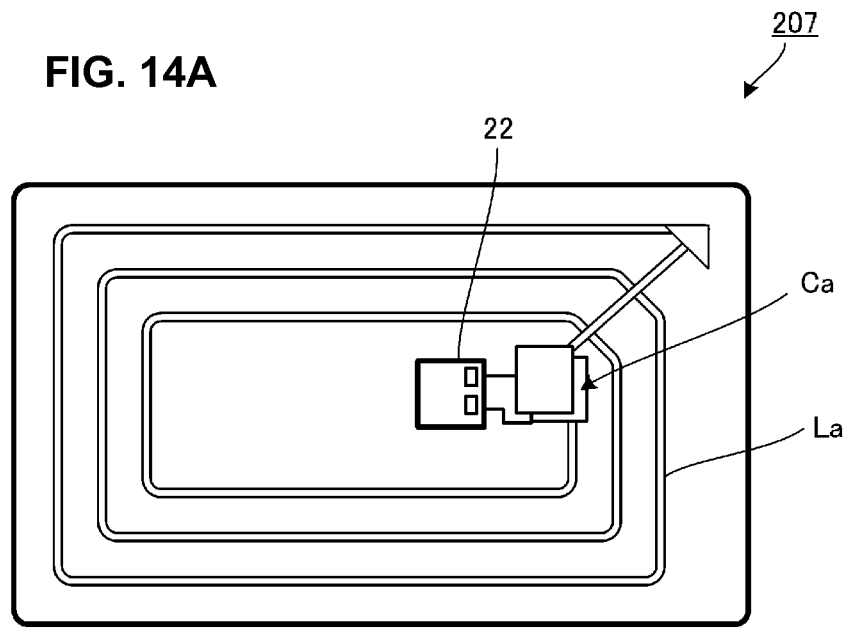
FIGS. 14A and 14B are diagrams illustrating a configuration of a radio frequency IC device according to a fifth preferred embodiment of the present invention.
Figure 14B:
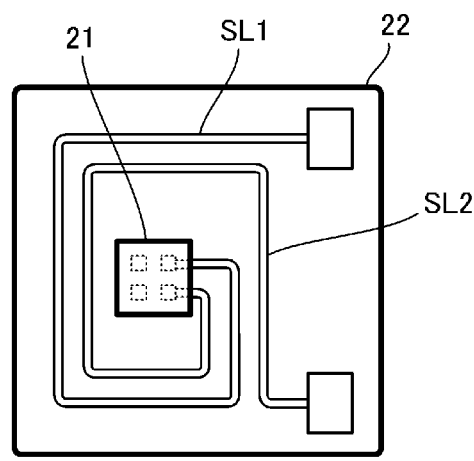

FIGS. 14A and 14B are diagrams illustrating the configuration of the radio frequency IC device 207 according to the fifth preferred embodiment. This example is an RFID card, and FIG. 14A illustrates the internal configuration of the card. FIG. 14B is an enlarged view of a module 22 included in the card.

The antenna coil La has a spiral conductor pattern inside the card. The conductor pattern has a plurality of turns and is located along the periphery of the card. The capacitor Ca includes opposite electrodes between which a dielectric layer is sandwiched.

The module 22 includes two adjacent lines SL1 and SL2 having different lengths and the radio frequency IC (chip) 21.

A capacitance is generated between the two lines SL1 and SL2 included in the module 22. Two additional resonance circuits preferably include the generated capacitance and the inductances of the lines SL1 and SL2. Accordingly, if the radio frequency IC device 207 is equivalently represented by a lumped-constant circuit, the lumped-constant circuit is the same as the circuit according to the fourth preferred embodiment illustrated in FIG. 12. Since the lines SL1 and SL2 have different lengths, different resonance frequencies of the two additional resonance circuits can be obtained.

Sixth Preferred Embodiment

Figure 15:
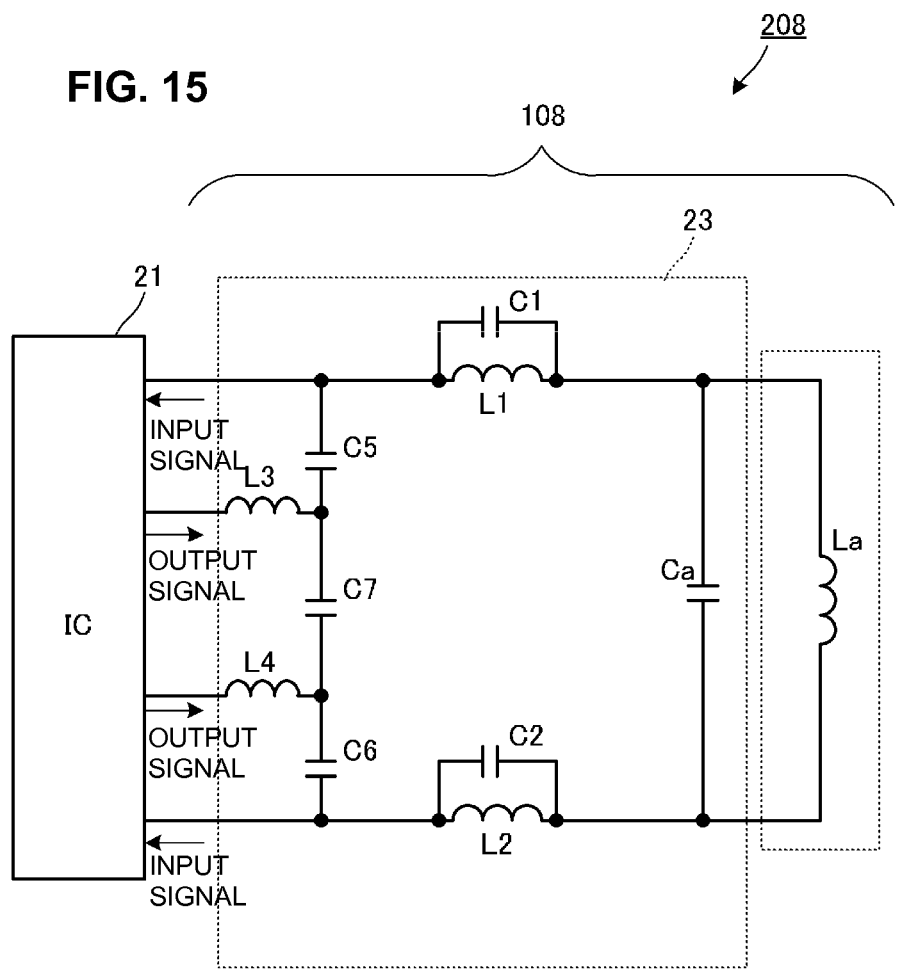
FIG. 15 is a circuit diagram illustrating configurations of a radio frequency IC device according to a sixth preferred embodiment and an antenna device included in the radio frequency IC device.

FIG. 15 is a circuit diagram illustrating the configuration of a radio frequency IC device 208 according to the sixth preferred embodiment which includes an antenna device 108. In FIG. 15, a circuit arranged to output a signal from the radio frequency IC 21 is also illustrated. An input portion for receiving a signal output from the radio frequency IC 21 is connected in series to output inductors L3 and L4. A matching circuit is defined by the output inductors L3 and L4 and capacitors C5, C6, and C7. More specifically, switching is performed in the radio frequency IC 21 by short-circuitting or opening one end of the output inductor L3 and one end of the output inductor L4 so as to change an impedance (return loss) which is obtained when the radio frequency IC device is observed from the antenna device included in the reader/writer. The reader/writer detects the change in the impedance, thereby receiving the signal transmitted from the radio frequency IC device.

The antenna device 108 has the antenna coil La, the capacitor Ca, a first additional resonance circuit including the inductor L2 and the capacitor C2, and a second additional resonance circuit including the inductor L2 and the capacitor C2. Components other than the radio frequency IC 21 and the antenna coil La are included in a module 23.

Figure 16A:
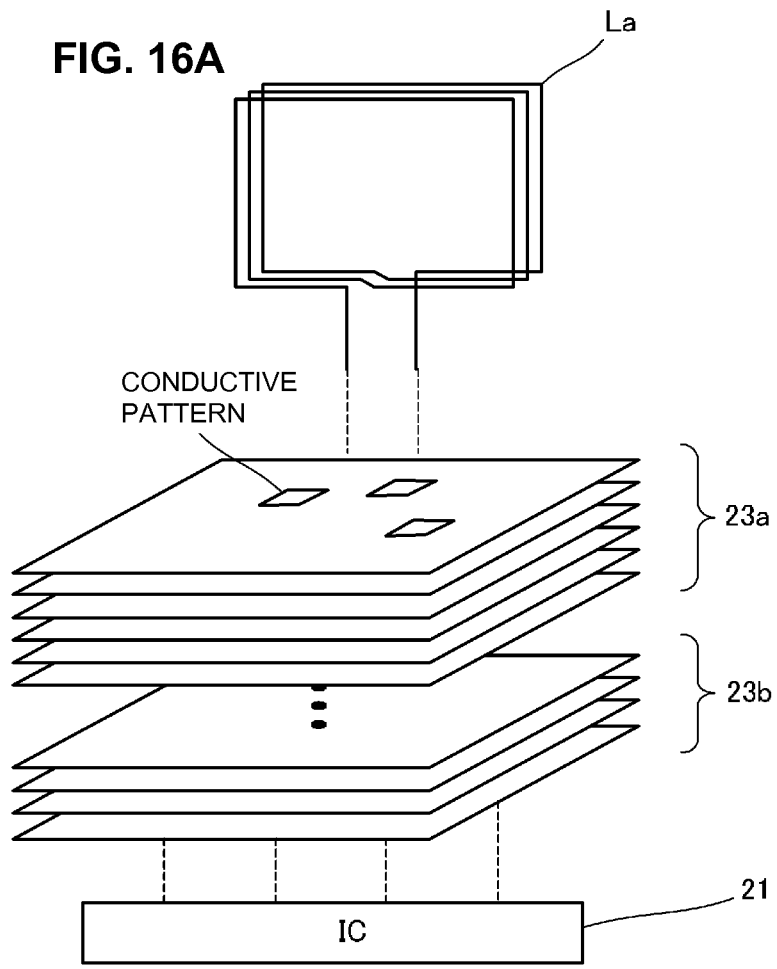
FIGS. 16A and 16B are diagrams illustrating a configuration of a module according to a sixth preferred embodiment and the entire configuration of a radio frequency IC device.
Figure 16B:
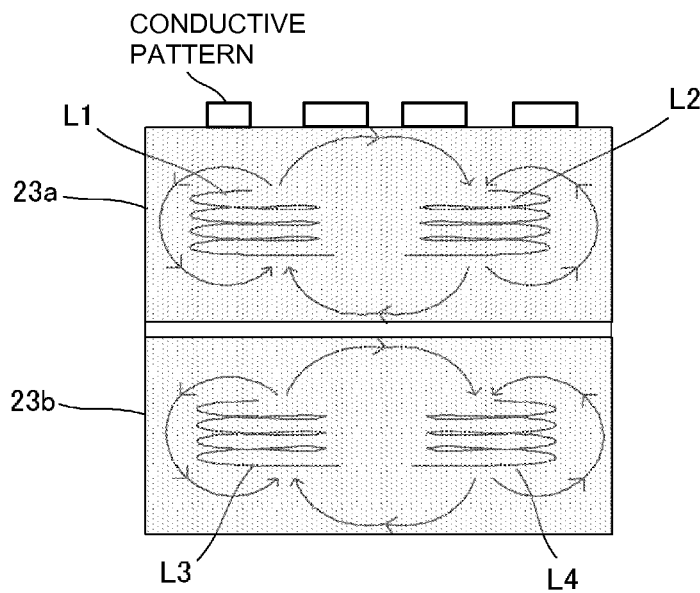

FIGS. 16A and 16B are diagrams illustrating the configuration of the module 23 and the entire configuration of the radio frequency IC device 208. The module 23 preferably includes a multilayer ferrite substrate. On an upper layer 23a of the multilayer substrate, the inductor L1 included in the first additional resonance circuit and the inductor L2 included in the second additional resonance circuit are provided. On a lower layer 23b of the multilayer substrate, the output inductors L3 and L4 are provided. Between the upper layer 23a and the lower layer 23b, a non-magnetic ceramic layer having a relative magnetic permeability μr of approximately one is sandwiched so as to prevent magnetic coupling.

In the upper layer 23a of the multilayer substrate, the inductor L1 and the inductor L2 are magnetically coupled. In the lower layer 23b of the multilayer substrate, the two output inductors L3 and L4 are magnetically coupled.

Thus, by achieving the magnetic field coupling between the inductors L1 and L2, the intervals of the resonance frequencies of the two additional resonance circuits can be fixed.

Chip capacitors corresponding to the capacitors C1, C2, C5, C6, and C7 illustrated in FIG. 15 are provided on the surface of the module 23 or in the module 23. The radio frequency IC 21 is also provided either on the surface of the multilayer substrate or in the multilayer substrate. In the case of the radio frequency IC 21, a cavity may be provided in the multilayer substrate and the radio frequency IC 21 may be disposed in the cavity.

Consequently, almost all of the required components can be included in a single module. Accordingly, for example, at the time of making an RFID card, the RFID card can be made only by forming the antenna coil La on the card in the form of a conductive pattern and installing the module 23 in the card.

In the case of a mobile telephone having an RFID function, the antenna coil La may be provided using a coil electrode disposed in the mobile telephone.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. An antenna device that is arranged to perform radio frequency communication with an external device, the antenna device comprising:
    an antenna element including a resonance circuit and configured to transmit or receive a radio frequency communication signal to or from an antenna element of the external device; and
    an additional resonance circuit that is connected to a radio frequency IC and magnetically coupled to the antenna element, that includes at least one inductor, and has a resonance frequency lower than a frequency in the radio frequency communication; wherein
    a resonance frequency of the resonance circuit and the resonance frequency of the additional resonance circuit are both near the frequency in the radio frequency communication;
    the resonance frequency of the resonance circuit and the resonance frequency of additional resonance circuit are in a same frequency band as the frequency in the radio frequency communication;
    the resonance circuit is not directly physically connected to the additional resonance circuit; and
    the additional resonance circuit is a feeding circuit disposed between the radio frequency IC and the antenna element of the antenna device and is configured to prevent a change in the frequency of the radio frequency communication signal transmitted from the antenna element of the antenna device due to a positional relationship between the antenna device and the external device.

2. The antenna device according to claim 1, wherein the antenna element is coupled to the antenna element of the external device via a magnetic field coupling.

3. The antenna device according to claim 2, wherein the frequency in the radio frequency communication is 13.56 MHz.

4. The antenna device according to claim 1, wherein a physical dimensional size of the inductor of the additional resonance circuit is smaller than a physical dimensional size of the antenna element.

5. The antenna device according to claim 1, wherein the inductor of the additional resonance circuit is magnetically shielded.

6. A mobile telephone comprising the antenna device according to claim 1.

7. The antenna device according to claim 1, wherein the resonance frequency of the resonance circuit is higher than the frequency in the radio frequency communication and the resonance frequency of the additional resonance circuit is lower than the frequency in the radio frequency communication.

* * * * *